(12) United States Patent
Takahashi

(10) Patent No.: US 7,139,343 B2
(45) Date of Patent: Nov. 21, 2006

(54) DIGITAL RADIO RECEIVER

(75) Inventor: Tsutomu Takahashi, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 867 days.

(21) Appl. No.: 10/193,276

(22) Filed: Jul. 12, 2002

(65) Prior Publication Data

US 2003/0185322 A1   Oct. 2, 2003

(30) Foreign Application Priority Data

Mar. 27, 2002  (JP)  ............................. 2002-089282

(51) Int. Cl.
*H04B 1/10*  (2006.01)

(52) U.S. Cl. .................. 375/350; 375/229; 375/230; 375/232; 375/233; 375/234

(58) Field of Classification Search ................ 375/230, 375/232, 234, 350, 229, 233
See application file for complete search history.

(56) References Cited

U.S. PATENT DOCUMENTS

| | | | | |
|---|---|---|---|---|
| 3,878,468 A | * | 4/1975 | Falconer et al. ............ | 375/235 |
| 4,253,184 A | * | 2/1981 | Gitlin et al. ................ | 375/232 |
| 4,481,643 A | * | 11/1984 | Kitazawa ..................... | 375/230 |
| 5,195,141 A | * | 3/1993 | Jang ........................... | 381/103 |
| 6,259,730 B1 | * | 7/2001 | Solondz ...................... | 375/232 |
| 6,775,334 B1 | * | 8/2004 | Liu et al. .................... | 375/341 |
| 6,907,064 B1 | * | 6/2005 | Tokunaga et al. ........... | 375/232 |
| 7,023,938 B1 | * | 4/2006 | Kapoor et al. .............. | 375/350 |

FOREIGN PATENT DOCUMENTS

JP        10-98500        4/1998

* cited by examiner

*Primary Examiner*—Chieh M. Fan
*Assistant Examiner*—Ted M. Wang
(74) *Attorney, Agent, or Firm*—Jacobson Holman PLLC

(57) ABSTRACT

The present invention is to provide a digital radio receiver using a carrier offset compensating circuit capable of compensating for carrier offsets even in a TDD communication system, and extending the range that can cope with offset frequencies to secure stable operation. The digital radio receiver is such that an initial phase correction part determines a phase shift from a known signal and corrects the phase shift, a multiplication part performs multiplication of a tap coefficient of the immediately preceding symbol from a first equalizer, and an equalizer performs waveform equalization while updating the coefficient based on an area-determination result.

7 Claims, 26 Drawing Sheets

RECEIVED SIGNAL

OUTPUT OF INITIAL PHASE CORRECTION PART

OUTPUT OF EQUALIZER 3

ERROR RATE IN FIRST CARRIER OFFSET
COMPENSATING CIRCUIT (SIMULATION)

OUTPUT OF EQUALIZER 3

OUTPUT OF EQUALIZER 4

ERROR RATE IN SECOND CARRIER OFFSET
COMPENSATING CIRCUIT (SIMULATION)

RECEIVED SIGNAL

OUTPUT OF INITIAL PHASE CORRECTION PART

OUTPUT OF EQUALIZER 5

OUTPUT OF EQUALIZER 3

ERROR RATE IN CONVENTIONAL CONFIGURATION
(SIMULATION)

FIG.20

| UW | DATA |
|---|---|

DIGITAL RADIO RECEIVER

BACKGROUND OF THE INVENTION

1. Field of the Invention

The present invention relates to a digital radio receiver used for digital radio communication, and in particular to a digital radio receiver that can extend the range of carrier offset compensation, to improve demodulation characteristics.

2. Description of the Related Art

In a modem utilizing a multi-value modulation system typified by a 16 QAM modulation system, both of transmitter and receiver (modulator and demodulator) perform modulation and demodulation using carrier signals from local oscillators that are basically on the same local frequency. In this case, a frequency error is caused due to a difference in oscillating frequency accuracy between the transmitter and receiver, a temperature change, a change with time, and so on. The frequency error manifests itself as a frequency offset (carrier offset) of a signal received.

The frequency offset (carrier offset) has become a major problem to be solved not only in the field of next-generation subscriber radio access (FWA: Fixed Wireless Access) systems, but also in keeping with the trend toward higher frequencies, that is, the trend in making frequency (RF: Radio Frequency) of radio communication higher.

The frequency offset manifests itself as a phase rotation with a fixed speed of the received signal after detected. To obtain a correct demodulated signal, the frequency offset needs compensating.

In the case of digital radio communication, there is one typical technique for frequency offset compensation. In this technique, a signal (UW: unique word) known to both the transmitter and the receiver, which may be used for synchronous acquisition or equalizer training, is transmitted by adding the same to transmitted data. On the receiver side, a phase error is detected from the unique word and the received signal, equalized through a PLL circuit or the like, and inputted as a voltage value to a voltage control oscillator as a local oscillator. Thus the local oscillation frequency on the receiver side is controlled to compensate for the frequency offset.

Another conventional technique for frequency offset compensation is a frequency offset compensating circuit using an equalizer.

When a carrier offset is corrected through a carrier offset compensating circuit using an equalizer, a frequency-to-error (BER) characteristic is plotted as shown in FIG. 19. FIG. 19 is a graph showing simulation results of the frequency-to-error (BER) characteristic in the conventional carrier offset compensating circuit.

One of conventional techniques for frequency offset compensation is disclosed in Japanese unexamined patent publication No. 10-98500 laid open on Apr. 14, 1998 and entitled "Automatic Frequency Control Method and Circuit" (Applicant: Kokusai Electric Co. Ltd., Inventor: Hiroki Goto).

In this conventional technique, a delay detector obtains phase differences among a plurality of symbols of a received signal containing a symbol known as a UW and variable data symbols. Based on the output of the delay detector, a discriminator obtains a residual phase-rotation component remaining after a modulation component of each variable data symbol is removed. Then, a phase shifter obtains a frequency offset estimated value, an LPF can do averaging the obtained frequency offset estimated value, and a complex multiplier compensates for the frequency error. The automatic frequency control method and circuit constituted such above can extend the frequency offset compensation range of an AFC used for base band signal processing in a reception/modulation circuit of a multi-value modulation system without deteriorating transmission efficiency.

However, when the conventional carrier offset compensating circuit is used in a TDD communication system, since the local oscillator cannot be controlled in a transmission section, some measures need to be taken such as to keep a control value obtained at the time of completion of reception. In any case, a frequency offset within a range corresponding to that of stability of the local oscillator is unavoidable, which causes a received signal to rotate in a reception section, and hence results in such a problem that the received signal cannot be demodulated properly.

In addition, the carrier offset compensating circuit with the equalizer incorporated therein shows a frequency-to-BER characteristic as shown in FIG. 19, which results in another problem that the carrier offset compensating circuit is limited in its range that can cope with offset frequencies.

SUMMARY OF THE INVENTION

It is an object of the present invention to provide a digital radio receiver using a carrier offset compensating circuit capable of compensating for carrier offsets even in TDD communication, and extending the range that can cope with offset frequencies to secure stable operation.

In attaining the above-mentioned conventional problems and according to the present invention, there is provided a digital radio receiver including a first equalizer, which performs waveform equalization while updating a tap coefficient based on a received signal and a result of determination of an area of the received signal to output a decoded signal, in which a multiplier is provided on the input side of the first equalizer to multiply the received signal by the tap coefficient updated by and outputted from the first equalizer so as to generate an input signal of the first equalizer, thereby extending the range of frequencies within which offset compensation is controllable.

In another aspect of the present invention, the digital radio receiver is provided with a second equalizer on the output side of the first equalizer, in which the second equalizer performs waveform equalization while updating the tap coefficient based on an output signal from the first equalizer and a result of determination of an area of the output signal to output a decoded signal, whereby the second equalizer compensates for any carrier offset that has not been adapted by the first equalizer alone. This configuration makes them possible to extend the range of frequencies within which offset compensation is controllable, and level a frequency-to-BER characteristic over a wide range of frequencies.

In still another aspect of the present invention, the digital radio receiver is provided with a third equalizer either on the input side of the multiplier or between the multiplier and the first equalizer, in which the third equalizer performs waveform equalization while updating the tap coefficient based on a known signal inserted in the received signal. This configuration makes possible, in addition to carrier offset compensation, removal of an interference component of a signal to compensate a propagation path or the like for its deterioration.

In yet another aspect of the present invention, the digital radio receiver is provided with an initial phase correction part for determining a phase shift from the known signal inserted in the received signal and correcting the initial phase so that the received signal with the corrected initial phase will be an input to the multiplier or the third equalizer. This configuration makes it possible to avoid the mistake of determining the area of the first signal, and hence speed up a convergence of equalization errors.

In yet another aspect of the present invention, the digital radio receiver is provided with an initial phase determination part for determining a phase shift from the known signal inserted in the received signal and outputting an initial phase offset value so that the third equalizer will set the initial phase offset value as the initial value of the tap coefficient. In this configuration, the initial phase is corrected without the provision of the initial phase correction part, so that the mistake of determining the area of the first signal can be avoided with a pared-down carrier offset compensating circuit, thereby speeding up a convergence of equalization errors.

BRIEF DESCRIPTION OF THE DRAWINGS

FIG. 20 is a diagram showing an example of the frame structure of a signal to be transmitted and received.

DESCRIPTION OF REFERENCE NUMERALS

1 . . . Initial Phase Correction Part, 2 . . . Multiplier, 3 . . . Equalizer (one-tap), 4 . . . Equalizer (one-tap), 5, 5' . . . Equalizer (10-tap), 6 . . . Initial Phase Determination Part, 31 . . . Multiplier, 32 . . . Discriminator, 33 . . . Adder, 34 . . . Tap Coefficient Updating Device, 51 . . . Waveform Equalizing Filter, 52 . . . Tap Coefficient Updating Device.

DESCRIPTION OF THE PREFERRED EMBODIMENTS

Embodiments of the present invention will be described with reference to the accompanying drawings.

It should be noted that feature implementing means to be described below may be any circuit or device as long as it can implement the features. Part or all of the features can also be implemented via software. Further, the feature implementing means may be a combination of two or more circuits, or a plurality of feature implementing means may be of a single circuit.

In a digital radio receiver according to the present invention, an initial phase correction part determines a phase shift from a known signal inserted in a received signal and corrects the initial phase. A multiplier multiplies the received signal by a tap coefficient updated by and outputted from a first equalizer. The first equalizer performs waveform equalization while updating the tap coefficient based on the received signal and a result of determination of an area of the received signal. A second equalizer performs waveform equalization while updating the tap coefficient based on an output signal from the first equalizer and a result of determination of an area of the output signal. A third equalizer updates a tap coefficient based on the known signal to perform waveform equalization. In this configuration, the mistake of determining the area of the first signal can be avoided to augment the rate of a convergence in which an error between a decoded signal and the area-determination result will be minimized. The range of frequencies within which carrier offset compensation is controllable can also be extended to level a frequency-to-BER characteristic over a wide range of frequencies. Further, an interference component of a signal can be removed to compensate a propagation path or the like for its deterioration.

Correspondences between parts in the embodiments and parts in the accompanying drawings are defined as follows: The first equalizer corresponds to an equalizer 3, the second equalizer corresponds to an equalizer 4, and the third equalizer corresponds to an equalizer 5.

Figure 1:
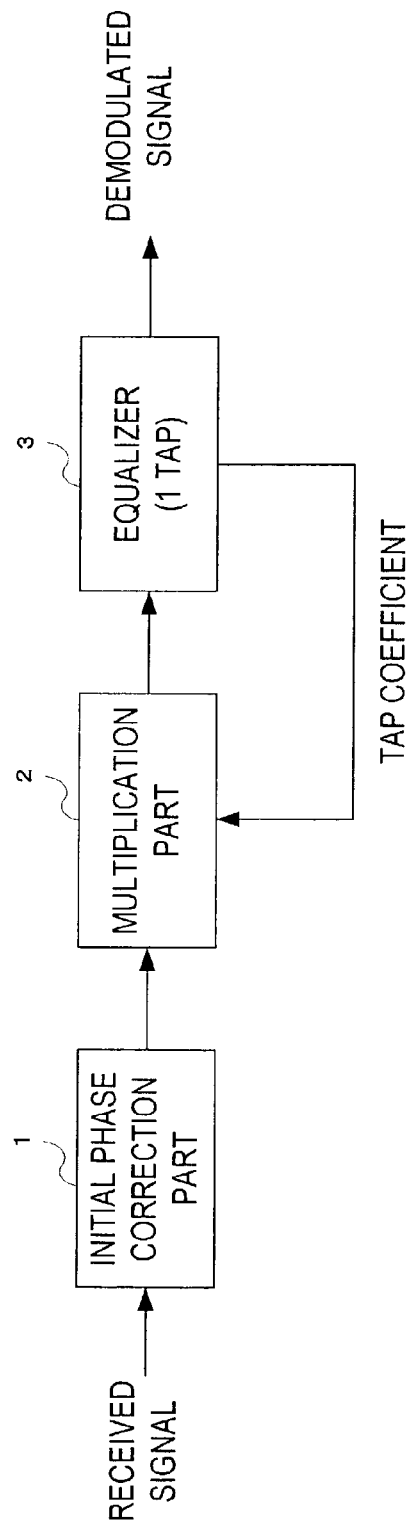
FIG. 1 is a block diagram of the arrangement of a carrier offset compensating circuit section of a digital radio receiver according to a first embodiment of the present invention.

Referring first to FIG. 1, a digital radio receiver according to the first embodiment of the present invention will be described. FIG. 1 is a block diagram of the arrangement of a carrier offset compensating circuit section of the digital radio receiver according to the first embodiment of the present invention.

As shown in FIG. 1, the carrier offset compensating circuit section (first carrier offset compensating circuit) of the digital radio receiver according to the first embodiment of the present invention is constituted of an initial phase correction part 1, a multiplication part 2, and the equalizer 3.

In FIG. 1, the connection of a received signal to each of the structural elements is indicated by an arrow, but the received signal is basically subjected to quadrature detection so that it will be separated into I-phase (in-phase) and Q-phase (quadrature-phase) component signals and processed.

Each part of the first carrier offset compensating circuit according to the present invention will be described below.

The initial phase correction part 1 detects, from a known unique word in the received signal, a phase difference at the head of the frame, and corrects the phase difference.

Figure 20:
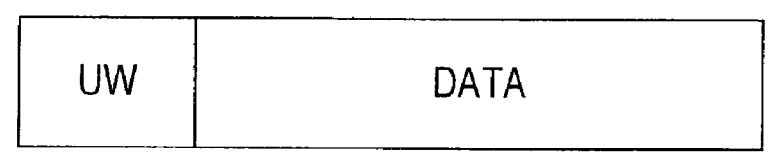

As shown in FIG. 20, one frame of transmitted data is typically composed of a unique word known to both the transmitter and receiver (UW in FIG. 20) and transmitted information (DATA in FIG. 20). FIG. 20 shows an example of the frame structure of a signal to be transmitted and received.

As shown in FIG. 20, the transmit side places the unique word (UW) known to both the transmitter and receiver (for example, 14 symbols) at the top of each frame of a sending signal, and transmits the sending signal. Upon receipt of the signal, the initial phase correction part 1 on the receive side determines the phase of each symbol from the following equation:

$$\theta = \arctan(Qr/Ir).$$

Then the initial phase correction part 1 calculates a difference of the phase of each UW symbol from the original phase to obtain a mean value. The mean value is used as a frame phase (initial phase) correction value to be multiplied across the frame.

It should be noted that the way of determining the phase of a symbol is not limited to a phase calculation of arcTan. When real-time processing is performed in an actual hardware environment, any other phase detection means conventionally known may be used.

Since an initial value of (1+j0) for the tap coefficient is passed through the subsequent equalizer, if the mistake of determining the area of the first signal is made, a convergence of equalization errors will get slower. Therefore, the initial phase correction is aimed at correcting the phase of the first signal to a required phase.

The multiplication part 2 is a typical multiplier that multiplies the received signal, the initial phase of which has been corrected by and outputted from the initial phase correction part 1, by a tap coefficient of the immediately preceding symbol outputted from the equalizer 3 to be described later, and outputs the multiplication results.

Since the received signal is basically subjected to quadrature detection so that it will be separated into I-phase and Q-phase component signals and processed, the multiplication part 2 is composed of a complex multiplier.

The frequency offset is to rotate the frequency in a fixed direction differently from fading. The multiplication part 2 performing multiplication of the current symbol data by the tap coefficient of the immediately preceding symbol means implementing carrier offset compensation while predicting a frequency offset to be rotated in the fixed direction, and hence extending the range that can cope with frequency offsets.

The equalizer 3 is a one-tap equalizer, which performs waveform equalization while updating a tap coefficient adaptively based on a received signal and its area-determination result in such a manner as to adapt the tap coefficient to a time-varying carrier offset.

Specifically, the equalizer 3 determines the area of the received signal, and multiplies the received signal by a tap coefficient while updating the tap coefficient based on an error between the received signal and its determination result so that the error will be minimized, thus performing waveform equalization.

The equalizer 3 of the present invention uses a typical tap coefficient updating algorithm, that is, the least means square (LMS) algorithm that minimizes the root means square error based on the steepest descent method.

Since the equalizer 3 is a one-tap equalizer, fast processing is possible, and quick response and stable operation can be expected soon after the initiation of communication.

Figure 2:
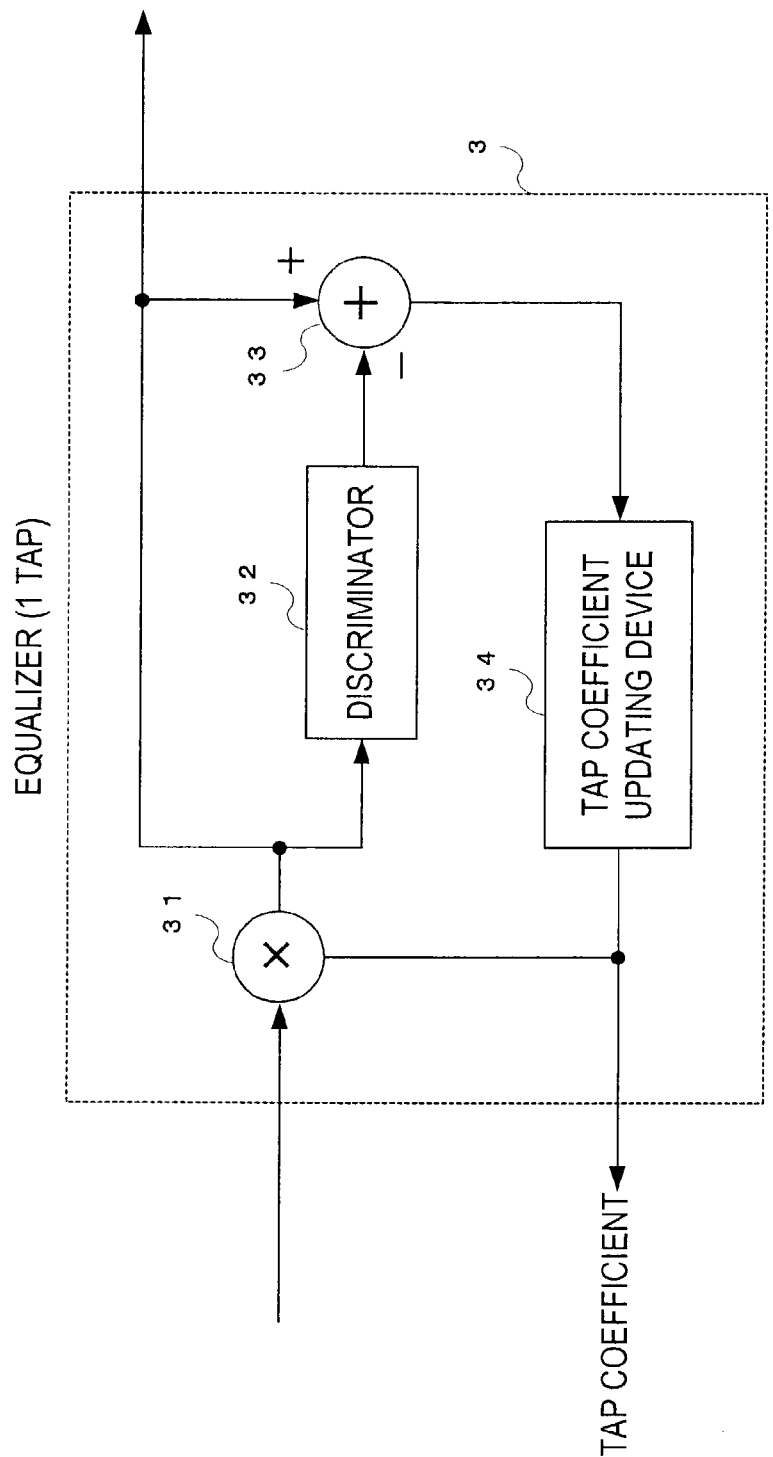
FIG. 2 is a block diagram showing an internal configuration of an equalizer according to the present invention.

Referring next to FIG. 2, description will be made about an internal configuration of the equalizer 3 in the carrier offset compensating circuit of the digital radio receiver according to the present invention. FIG. 2 is a block diagram showing an internal configuration of the equalizer of the present invention.

The equalizer 3 of the present invention is internally constituted of a multiplier 31, a discriminator 32, an adder 33, and a tap coefficient updating device 34.

The multiplier 31 multiplies a received signal being inputted and a tap coefficient updated by the tap coefficient updating device 34 together, the tap coefficient updating device 34 being described later.

The discriminator 32 determines the area of data multiplied by the tap coefficient.

The adder 33 is an adder (subtracter) for determining the difference (error) between the data multiplied by the tap coefficient and its area-determination result.

The tap coefficient updating device 34 determines and outputs such a tap coefficient as to minimize the error according to the inputted error.

The tap coefficient updating device 34 uses, as its tap updating algorithm, the least means square (LMS) algorithm that minimizes the root means square error based on the steepest descent method, and the number of taps is one.

Then, the initial value of the tap coefficient is set to (1+j0), and the tap coefficient is reset to the initial value on a frame basis so as to speed up a convergence of equalization errors in the equalizer 3 and pass the first signal through the multiplication part 2.

Figure 3:
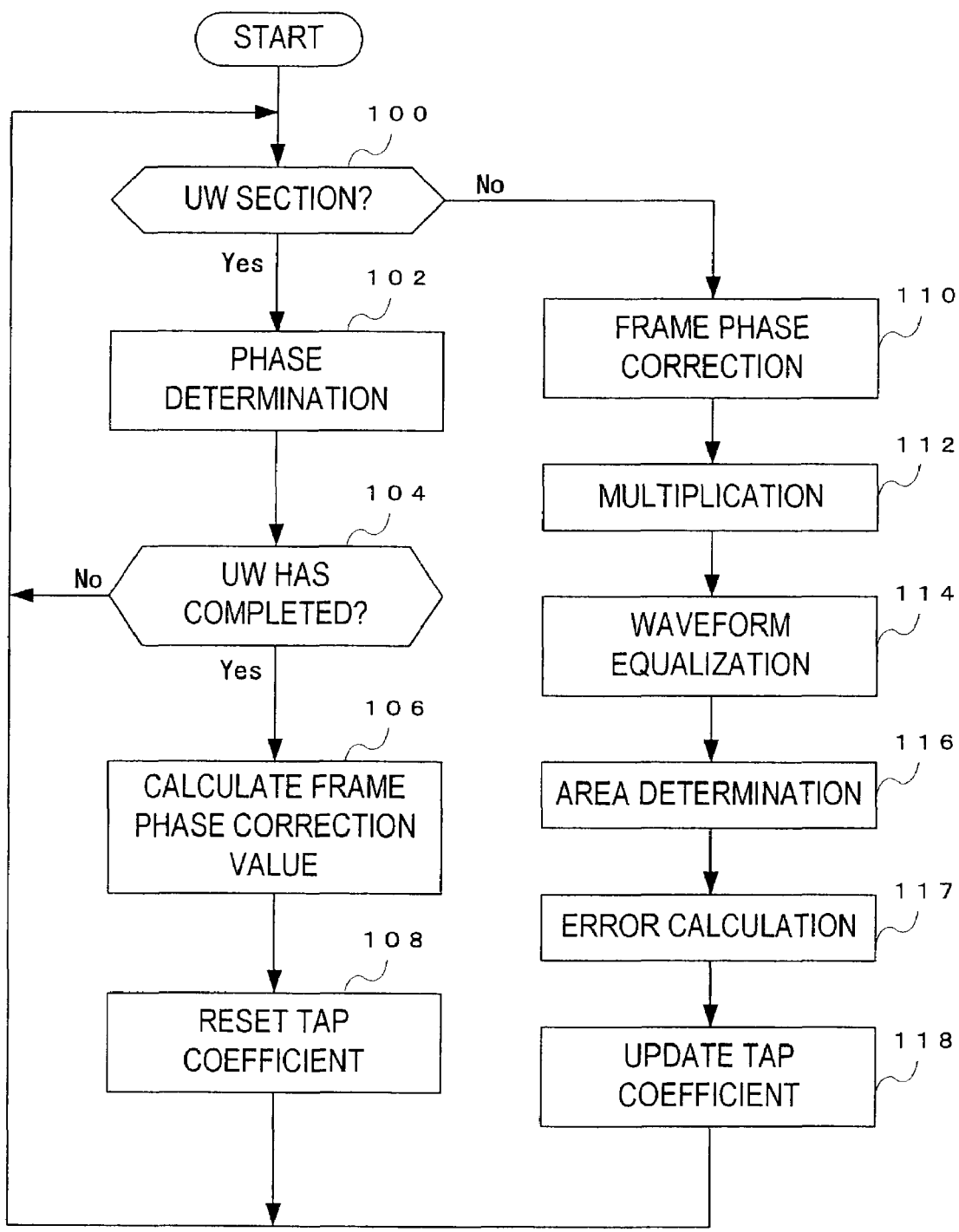
FIG. 3 is a flowchart showing the flow of operation performed on each symbol in a first carrier offset compensating circuit according to the present invention.

Referring next to FIG. 3, description will be made about the operation of the first carrier offset compensating circuit according to the present invention. FIG. 3 is a flowchart showing the flow of operation performed on each symbol in the first carrier offset compensating circuit of the present invention.

The first carrier offset compensating circuit of the present invention determines whether the current symbol is in the UW section (100). If it is in the UW section (Yes), the initial phase correction part 1 makes a phase determination (102) to determine whether the UW section has completed (104). If the UW section has not completed yet (No), the procedure returns to the processing 100 to repeat the phase determination of the UW.

Then, when it is determined in the processing 104 that the UW section has completed (Yes), the initial phase correction part 1 calculates a frame phase correction value (106), and the tap coefficient updating device 34 of the equalizer 3 resets the tap coefficient to the initial value (1+j0) (108). After that, the procedure returns to the processing 100.

Then, when it is determined in the processing 100 that the symbol is no longer in the UW section, that is, the symbol has entered the DATA part (No), the initial phase correction part 1 corrects the frame phase based on the frame phase correction value (110). The multiplication part 2 multiplies the corrected phase and the initial value (1+j0) of the tap coefficient together, and lets the same pass through the multiplication part 2 (112). The multiplier 31 in the equalizer 3 also multiplies the output of the multiplication part 2 by the initial value (1+j0) of the tap coefficient, and lets the same pass through the multiplier 31, thus performing waveform equalization (114). Then, the discriminator 32 makes an area determination (116), the adder 33 determines an error between the waveform-equalized signal and the determination result (117), and the tap coefficient updating device 34 updates the tap coefficient based on the determined error (118). After that, the procedure returns to the processing 100 to repeat waveform equalization and tap coefficient updating for the next symbol.

Figure 4:
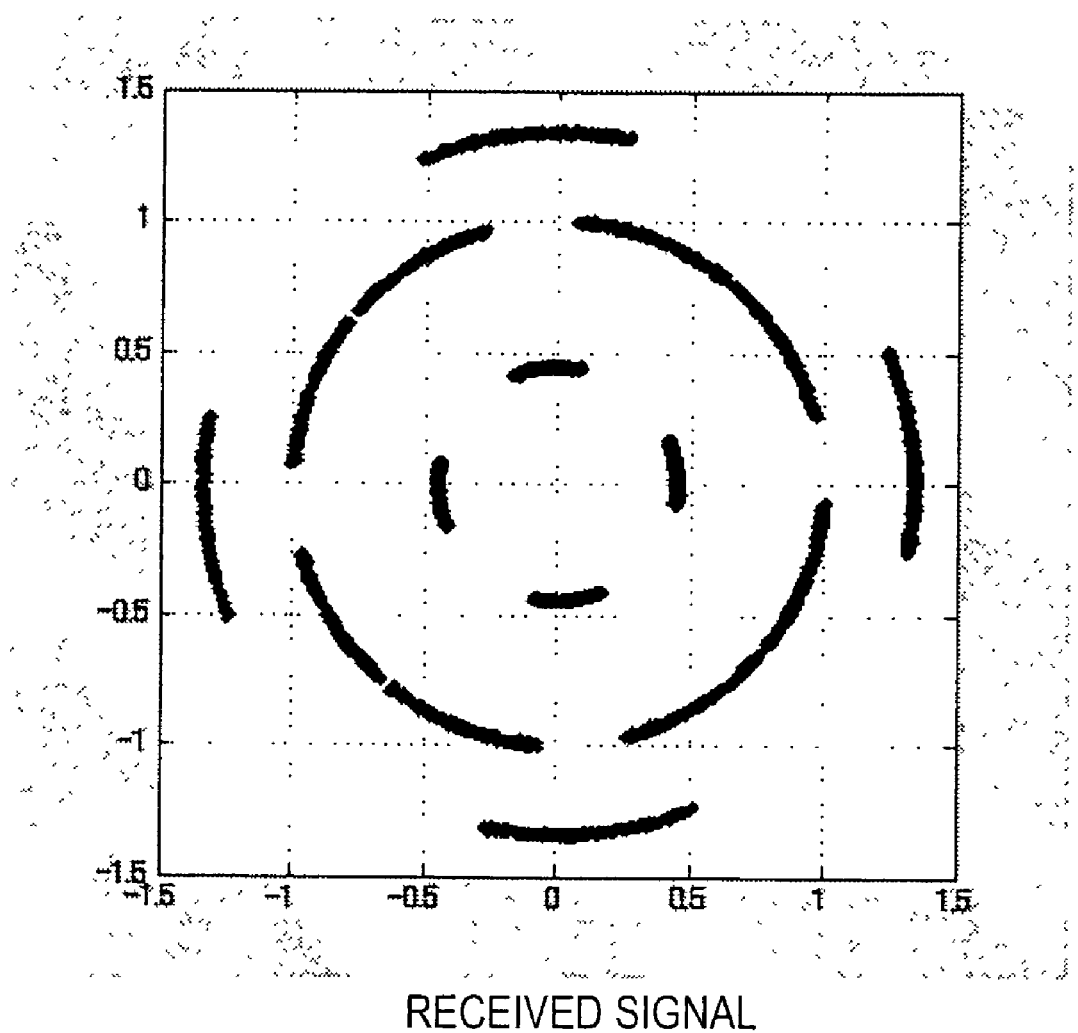
FIG. 4 is an illustration showing an example of a received signal being handled in the fist carrier offset compensating circuit according to the present invention.
Figure 5:
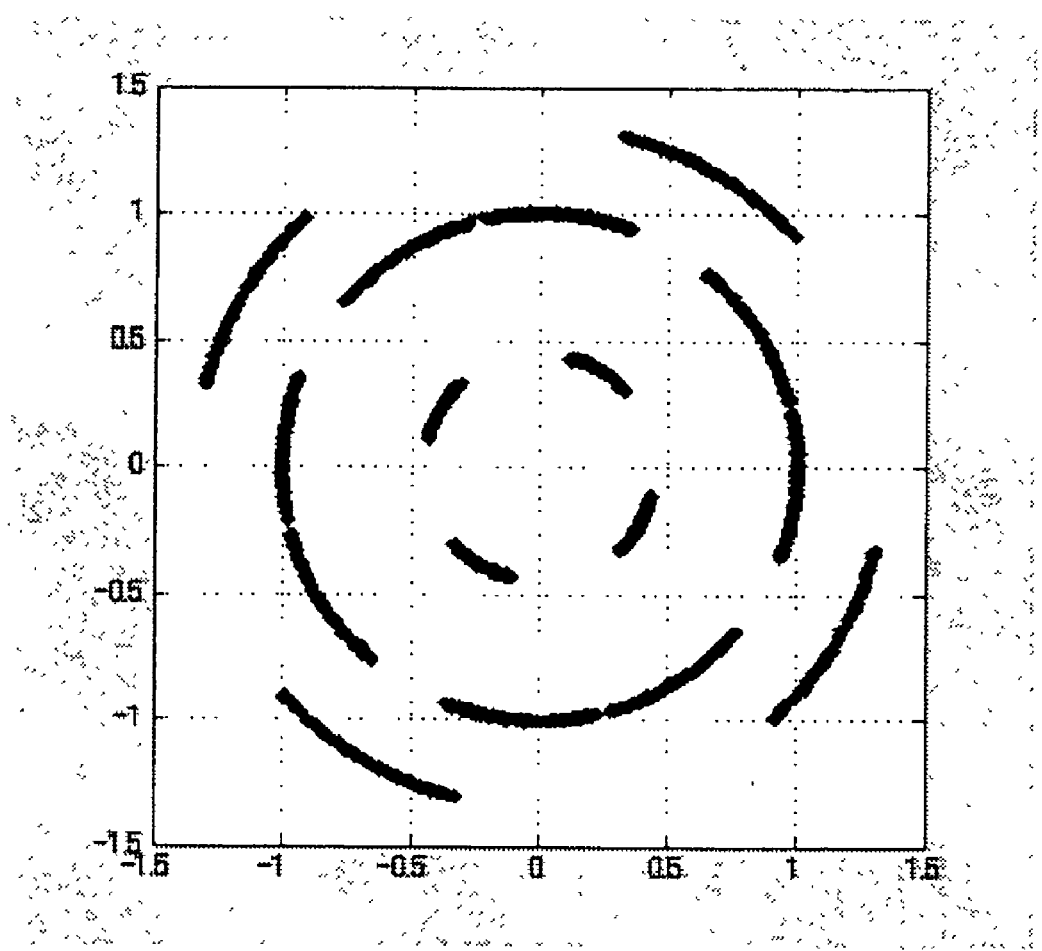
FIG. 5 is an illustration showing an example of an output signal from an initial phase correction part of the first carrier offset compensating circuit according to the present invention.
Figure 6:
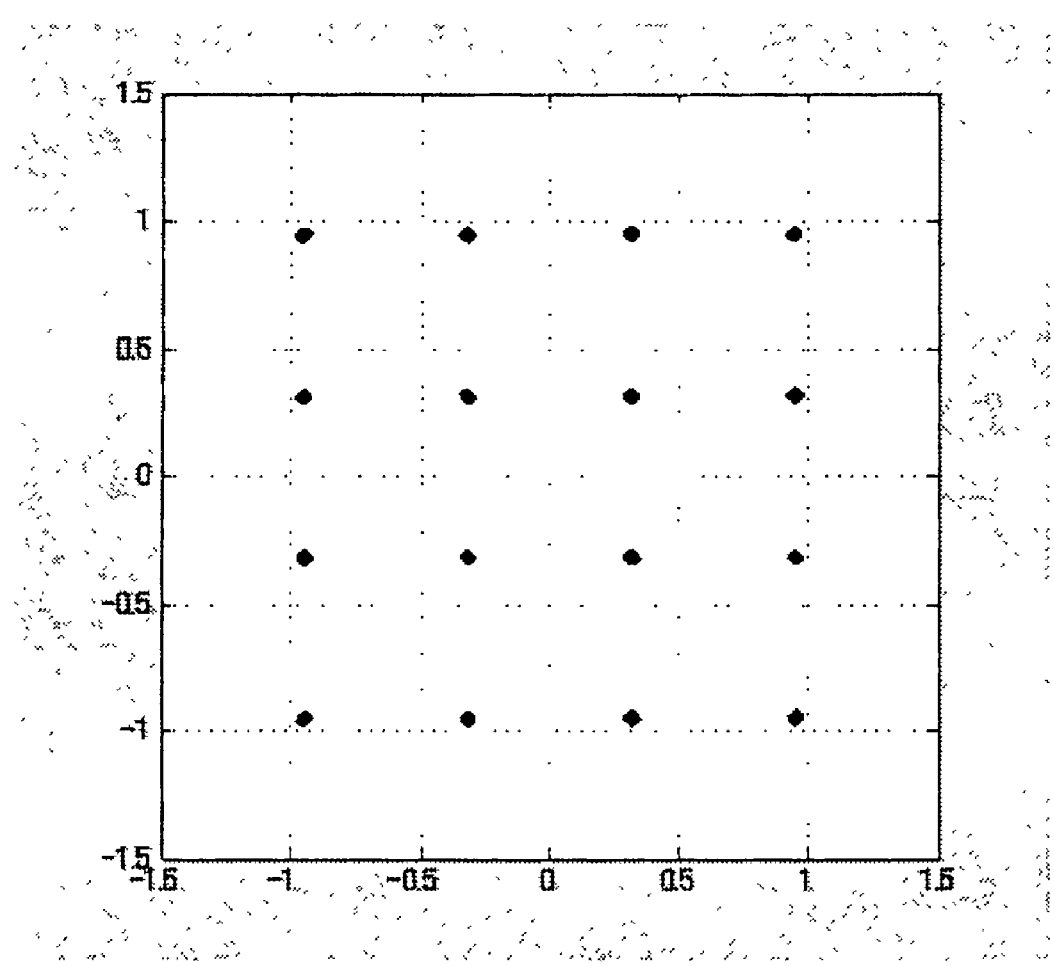
FIG. 6 is an illustration showing an example of an output signal from the equalizer of the first carrier offset compensating circuit according to the present invention.

Next, the results of operation of the first carrier offset compensating circuit shown in FIG. 1 will be described using specific examples of FIGS. 4 to 6. FIG. 4 is an illustration showing an example of a received signal in the first carrier offset compensating circuit. FIG. 5 is an illustration showing an example of an output signal from the initial phase correction part 1 of the first carrier offset compensating circuit. FIG. 6 is an illustration showing an example of an output signal from the equalizer 3 of the first carrier offset compensating circuit.

As shown in FIG. 4, it is assumed that the received signal being inputted into the initial phase correction part 1 is as follows: The modulation system is 16 QAM, the amount of carrier offset is 100 Hz, the direction of rotation of the received signal is counterclockwise, and the initial phase shift is about −58°.

First, the initial phase correction part 1 detects a phase difference at the head of the frame from the UW data inserted in the received frame, and outputs a signal with the phase difference corrected.

Since the received signal shown in FIG. 4 has an initial phase shift of about −58°, the phase at the head of the frame can be made in phase with the original phase by rotating it +58°. Therefore, the signal with the initial phase corrected becomes as shown in FIG. 5, in which only the initial phase is corrected by +58 with keeping the rotation of the received signal.

The signal with the initial phase corrected is inputted into the multiplication part 2 in which the signal is multiplied by a tap coefficient from the equalizer 3. In this case, since the initial value of the tap coefficient is first set to (1+j0), the multiplication part 2 lets the input signal through as it is.

For a second and further time, since a tap coefficient of the immediately preceding symbol outputted from the equalizer 3 is multiplied, the rotation that would be corrected for the immediately preceding symbol is expected to cause a rotation for the next symbol too. Therefore, the multiplication part 2 corrects the rotation ahead of time.

The signal outputted from the multiplication part 2 is inputted into the equalizer 3 in which the multiplier 31 multiplies the signal again by the initial value (1+j0) of the tap coefficient, and lets the same through as it is. Then, the discriminator 32 makes an area determination, the adder subtracts the determination result from the discriminator 32, from the multiplication result from the multiplier 31 to calculate an error, and the tap coefficient updating device 34 updates the tap coefficient based on the error. The operation for updating a tap coefficient on a signal basis and outputting the updated tap coefficient to the multiplication part 2 and the multiplier 31 is repeated.

As a result of the operation of the circuit, the phase rotation in the fixed direction becomes extinct as shown in FIG. 6, and the signal is corrected to settle down at positions near stationary points on the orthogonal coordinates. It can be found from FIG. 6 that carrier offset compensation is successful.

Figure 7:
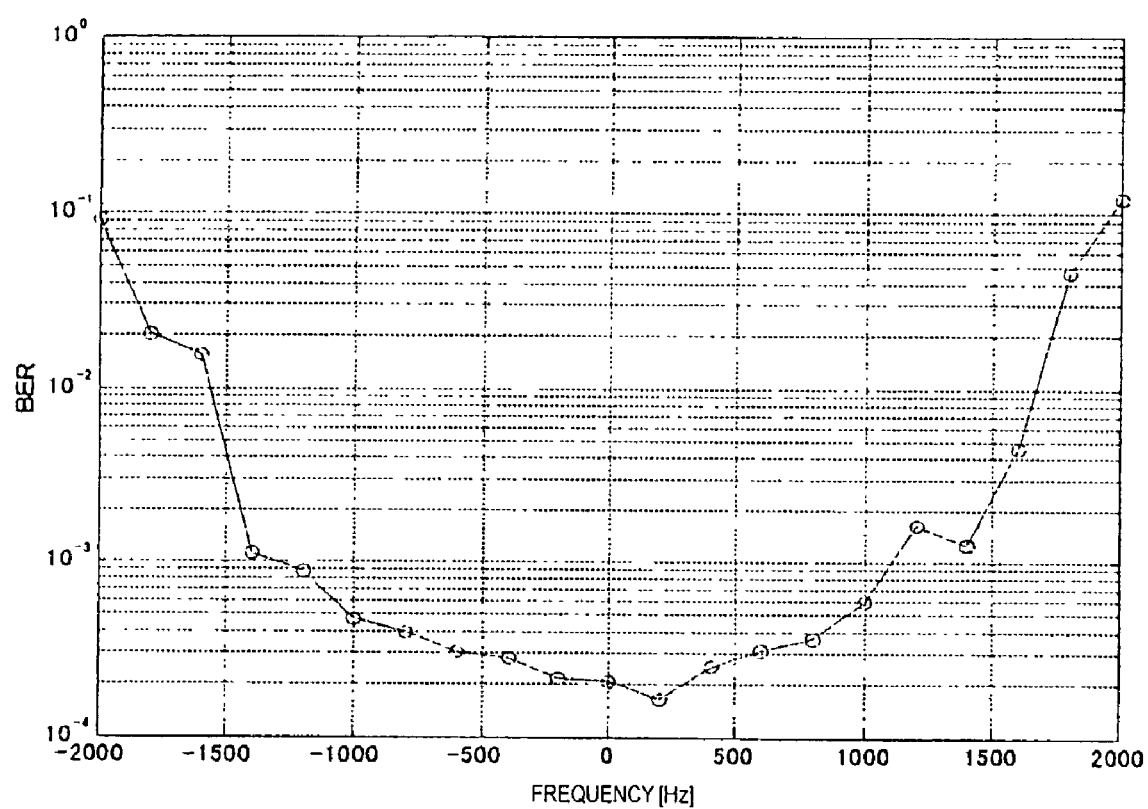
FIG. 7 is a graph showing a frequency-to-error rate (BER) characteristic as a result of simulation in the configuration of the first carrier offset compensating circuit according to the present invention.

Referring next to FIG. 7, description will be made about results of another simulation for determining a frequency characteristic to an error rate (BER) in the configuration of the first carrier offset compensating circuit shown in FIG. 1. FIG. 7 is a graph showing an error rate- (BER-) to-frequency characteristic as a result of the simulation in the configuration of the first carrier offset compensating circuit.

The simulation was done under the following conditions: The frame length is 1024 ms=1024 symbols, the number of frames is 100 frames, the symbol rate is 1 Msps, the modulation system is 16 QAM with an SNR (signal-to-noise ratio) of 18 dB, and the carrier frequency is ±2000 Hz.

In a specific simulation method, the amount of phase rotation in the initial phase correction part 1 is determined from $\theta=\arctan(Qr/Ir)$ on a symbol basis, and averaged to obtain a frame phase (initial phase) correction value.

Assuming that the I-phase component of the received signal is Ir and the Q-phase component is Qr, initial phase correction outputs I and Q in the initial phase correction part 1 are obtained by the following equations:

$$I = Ir \times \cos(\theta) - Qr \times \sin(\theta), \text{ and}$$

$$Q = Ir \times \sin(\theta) + Qr \times \cos(\theta).$$

The initial phase correction outputs I and Q are substituted for variables Xi and Xq to obtain a set of tap coefficients Wi and Wq. As a result, outputs Yi and Yq of the multiplication part 2 become as follows:

$$Yi = Xi \times Wi - Xq \times Wq, \text{ and}$$

$$Yq = Xi \times Wq + Xq \times Wi.$$

If outputs of the discriminator 32 are Yid and Yqd, errors Ei and Eq outputted from the adder 33 become as follows:

$$Ei = Yi - Yid, \text{ and}$$

$$Eq = Yq - Yqd.$$

From the errors Ei and Eq, changed values dWi and dWq for the tap coefficient are obtained on the basis of the LMS algorithm as follows:

$$dWi = (Ei \times Xi + Eq \times Xq) \times \mu, \text{ and}$$

$$dWq = (Eq \times Xi - Ei \times Xq) \times \mu,$$

where μ is a step-size parameter.

The set of tap coefficients Wi and Wq updated by and finally outputted from the tap coefficient updating device 34 become as follows:

$$Wi = Wi - dWi, \text{ and}$$

$$Wq = Wq - dWq.$$

Then the updating of the tap coefficients is repeated to simulate the output of each part.

FIG. 7 shows a frequency-to-error (BER) characteristic as a result of the simulation in the configuration shown in FIG. 1, choosing frequency and BER as the abscissa and ordinate respectively.

Figure 19:
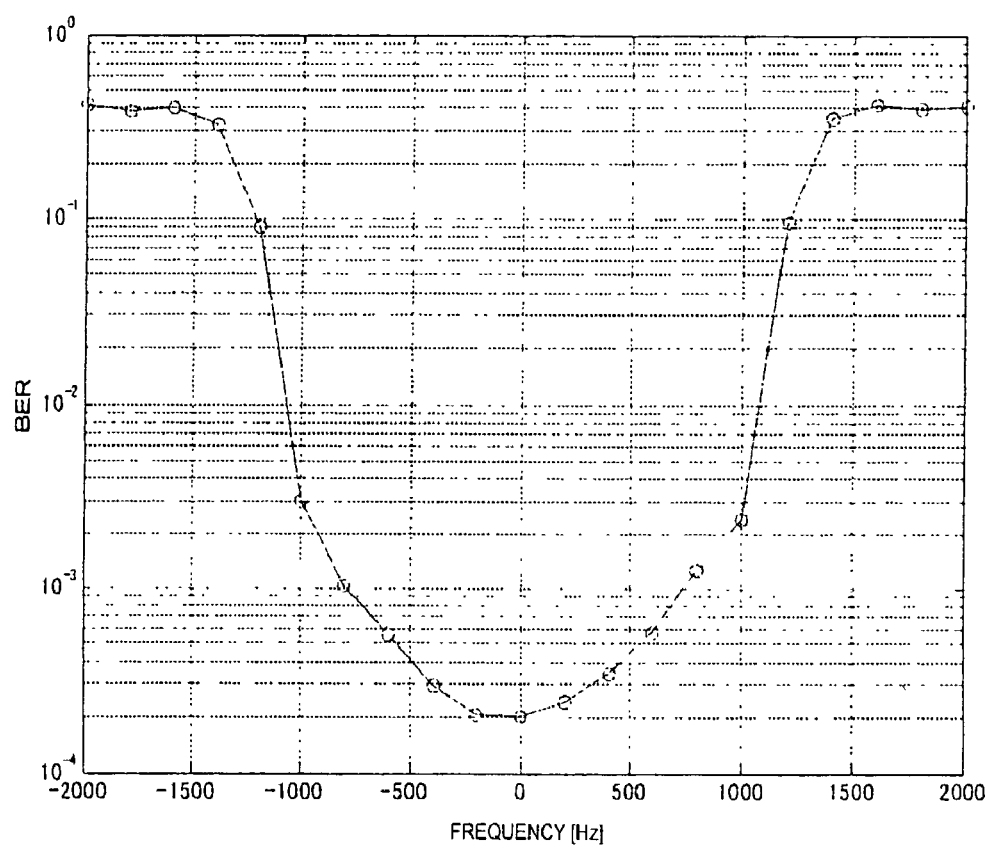
FIG. 19 is a graph showing simulation results of a frequency-to-error (BER) characteristic in a conventional carrier offset compensating circuit.

When comparing with the results of simulation that was done under the same conditions in the conventional carrier offset compensating circuit shown in FIG. 19, for example, at a value of BER=$5 \times 10^{-3}$, the conventional configuration of FIG. 19 is limited to about ±500 Hz in the range of frequencies that can make BER=$5 \times 10^{-3}$, but the characteristic shown in FIG. 7 in the configuration of FIG. 1 achieves a frequency of ±1000 Hz. It can be found from the comparison that the provision of the multiplication part 2 can extend the range of frequencies within which the carrier offset compensation is controllable.

Figure 8:
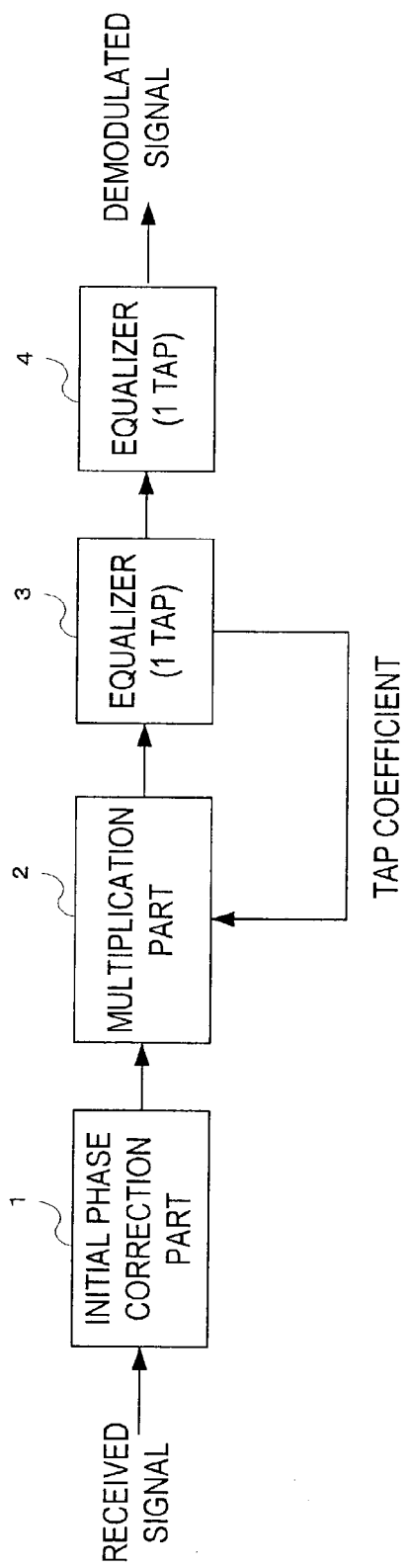
FIG. 8 is a block diagram of the arrangement of a carrier offset compensating circuit section of a digital radio receiver according to a second embodiment of the present invention.

Referring next to FIG. 8, description will be made about a digital radio receiver according to the second embodiment of the present invention. In the second embodiment, the frequency characteristic to the error rate (BER) is further improved. FIG. 8 is a block diagram of the arrangement of a carrier offset compensating circuit section of the digital radio receiver according to the second embodiment of the present invention. In FIG. 8, the same portions as those in FIG. 1 are given the same reference numerals.

As shown in FIG. 8, the carrier offset compensating circuit section (second carrier offset compensating circuit) of the digital radio receiver according to the second embodiment of the present invention is provided with an equalizer 4 as a feature part of the second carrier offset compensating circuit, in addition to the same configuration as the first carrier offset compensating circuit that is constituted of the initial phase correction part 1, the multiplication part 2, and the equalizer 3.

Since the operation of each of the initial phase correction part 1, the multiplication part 2, and the equalizer 3 is the same as that of the first carrier offset compensating circuit, the description of those parts will be omitted.

The equalizer 4 is an equalizer for performing waveform equalization on some of output signals waveform-equalized by the equalizer 3, the carrier offset of which have not been sufficiently adapted by the equalizer 3, while updating a tap coefficient adaptively based on an input signal and a result of determination of an area of the input signal.

Specifically, the equalizer 4 determines the area of the input signal, and performs waveform equalization by multiplying the input signal by a tap coefficient while updating the tap coefficient based on the error between the determination result and the input signal so that the error will be minimized.

Like the equalizer 3, the equalizer 4 uses, as its tap updating algorithm, the least means square (LMS) algorithm, and the number of taps is one. The initial value of the tap coefficient is also set to (1+j0), and the tap coefficient is reset to the initial value on a frame basis.

The internal configuration of the equalizer 4 is almost the same as that of the equalizer 3 shown in FIG. 2. A different point is that the tap coefficient updated by and outputted from the tap coefficient updating device 34 in the equalizer 4 is used merely by the multiplier 31 in the equalizer 4 without being outputted outside of the equalizer 4.

Figure 9:
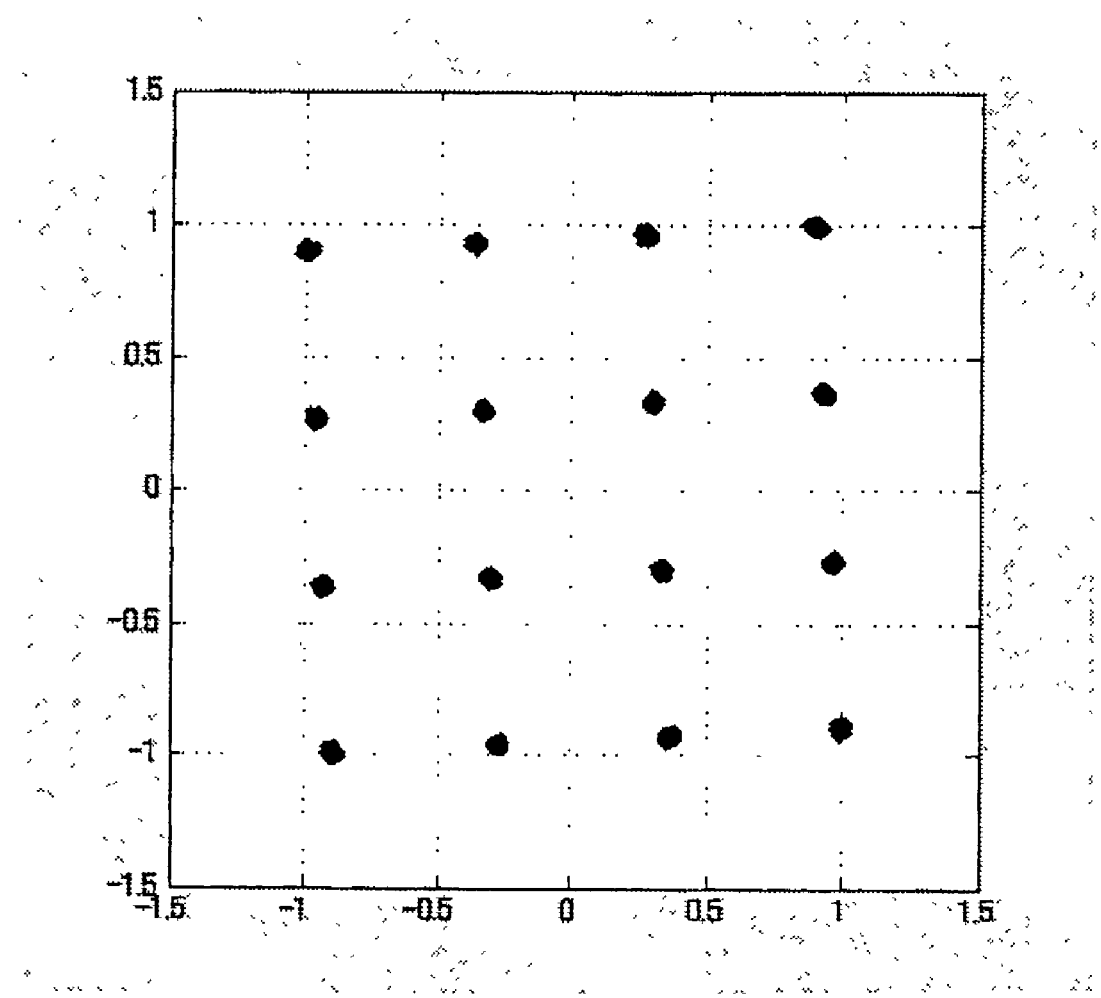
FIG. 9 is an illustration showing an example of an output signal from an equalizer 3 of a second carrier offset compensating circuit according to the present invention.
Figure 10:
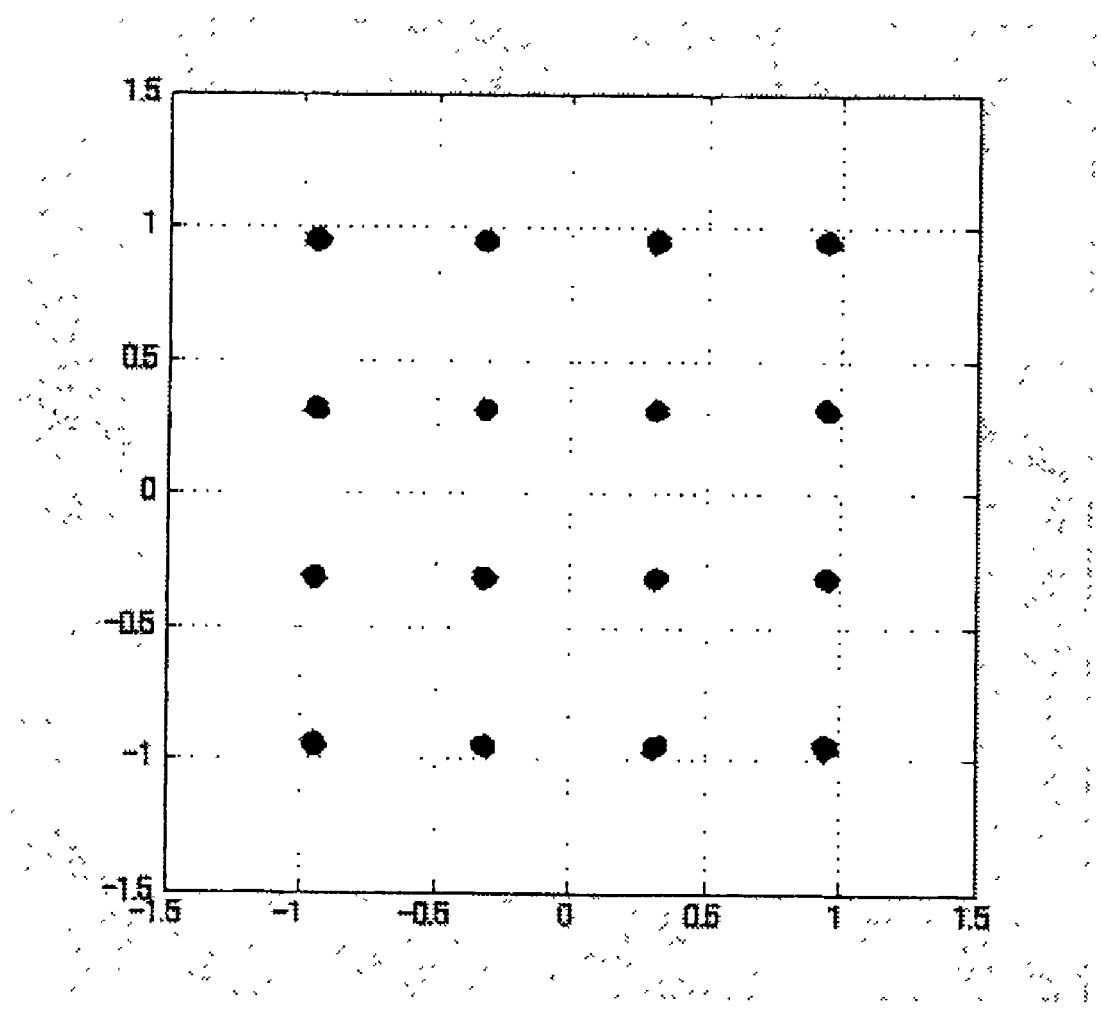
FIG. 10 is an illustration showing an example of an output signal from an equalizer 4 of the second carrier offset compensating circuit according to the present invention.
Figure 11:
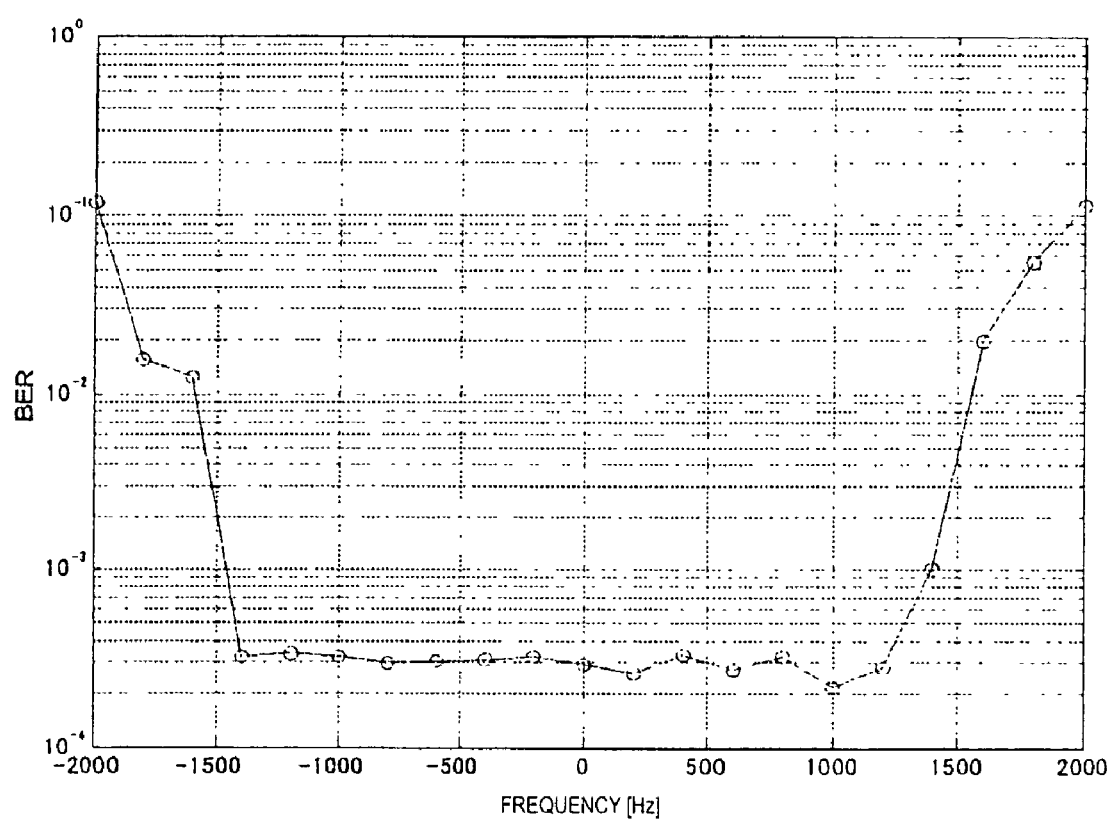
FIG. 11 is a graph showing a frequency-to-error rate (BER) characteristic in the second carrier offset compensating circuit according to the present invention.

Referring next to FIGS. 9 to 11 and using output examples as a result of simulation, description will be made about the operation of the second carrier offset compensating circuit according to the present invention. FIG. 9 is an illustration showing an example of an output signal from the equalizer 3 in the second carrier offset compensating circuit. FIG. 10 is an illustration showing an example of an output signal from the equalizer 4 in the second carrier offset compensating circuit. FIG. 11 is a graph showing a frequency characteristic to an error rate (BER) in the second carrier offset compensating circuit. It should be noted that the simulation was done under the same conditions as those for the first carrier offset compensating circuit.

In the second carrier offset compensating circuit of the present invention, the operation from the initial phase correction part 1 to the equalizer 3 is exactly the same as that in the first carrier offset compensating circuit.

When the equalizer 3 becomes insufficient to follow and adapt a carrier offset frequency, since the signal waveform from the equalizer 3 becomes inclined, a signal as shown in FIG. 9 is outputted.

This inclination causes the mistake of making an area determination upon decoding, resulting in a bowl-shaped frequency-to-error (BER) characteristic as shown in FIG. 7.

To avoid this, the second carrier offset compensating circuit is constituted such that the signal outputted from the equalizer 3 is inputted into the equalizer 4. In the equalizer 4, the multiplier 31 multiplies the signal by the initial value (1+j0) of the tap coefficient, and lets the signal through as it is. Then, the discriminator 32 makes an area determination, the adder 33 subtracts the determination result from the discriminator 32, from the multiplication result from the multiplier 31 to calculate an error, and the tap coefficient updating device 34 updates the tap coefficient based on the error. The operation for outputting to the multiplier 31 the tap coefficient updated for each signal is repeated.

Thus, the output of the equalizer 3 is compensated for its inclination.

As a result of the operation of the circuit, the signal waveform is compensated for even its slight inclination, and corrected to settle down at points closer to stationary points on the orthogonal coordinates. It can be found that carrier offset compensation is performed with higher accuracy.

FIG. 11 shows a frequency-to-error (BER) characteristic as a result of the simulation in the configuration shown in FIG. 8, choosing frequency and BER as the abscissa and ordinate respectively. A comparison with the characteristic of the first carrier offset compensating circuit shown in FIG. 7 shows that not only the range of frequencies within which carrier offset compensation is controllable is extended up to ±1200 Hz or so, but also the frequency-to-error (BER) characteristic is leveled over a wide range. It can be found from the comparison that compensation accuracy is improved.

Figure 12:
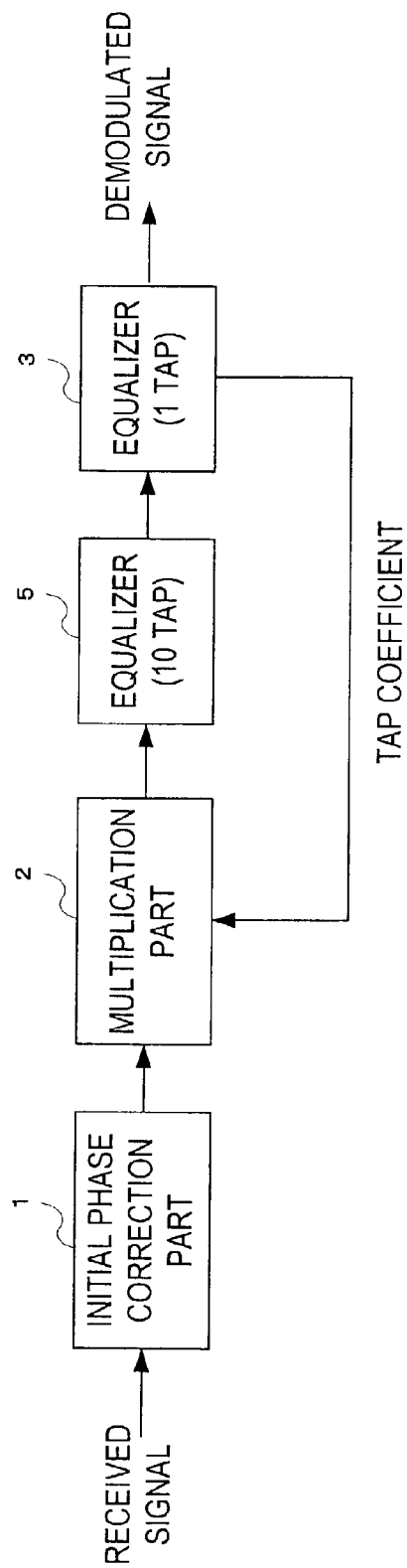
FIG. 12 is a block diagram of the arrangement of a carrier offset compensating circuit section of a digital radio receiver according to a third embodiment of the present invention.

Referring next to FIG. 12, description will be made about a digital radio receiver according to the third embodiment of the present invention. In the third embodiment, signal degradation such as waveform distortion in a propagation path is compensated for. FIG. 12 is a block diagram of the arrangement of a carrier offset compensating circuit section of the digital radio receiver according to the third embodiment of the present invention. In FIG. 12, the same portions as those in FIG. 1 are given the same reference numerals.

As shown in FIG. 12, the carrier offset compensating circuit section (third carrier offset compensating circuit) of the digital radio receiver according to the third embodiment of the present invention is provided with an equalizer 5 as a feature part of the third carrier offset compensating circuit, in addition to the same configuration as the first carrier offset compensating circuit that is constituted of the initial phase correction part 1, the multiplication part 2, and the equalizer 3.

Figure 21:
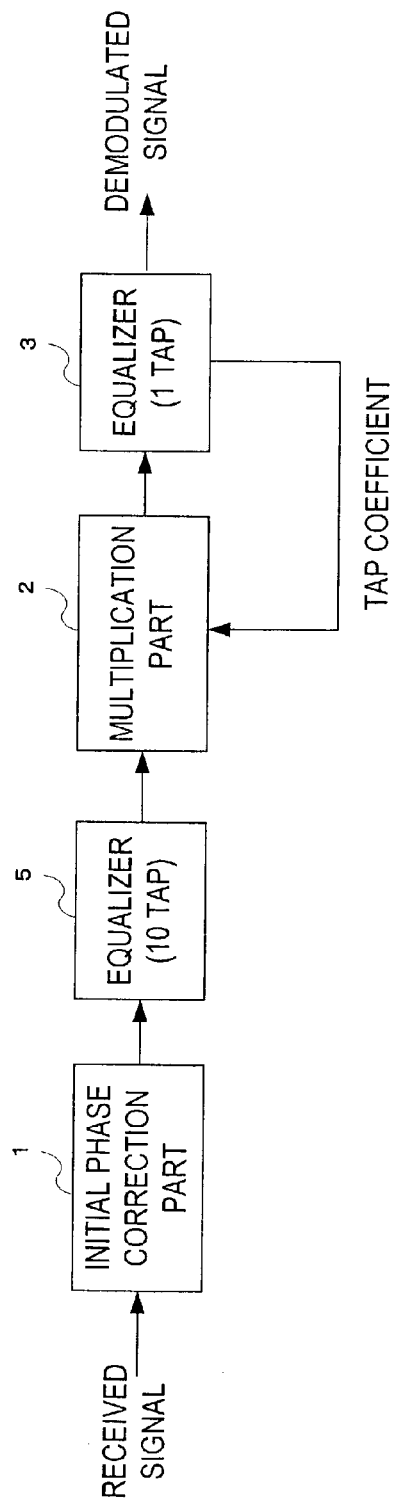
FIG. 21 is a block diagram showing another example of the arrangement of the carrier offset compensating circuit section of the digital radio receiver according to the third embodiment of the present invention.

Although in FIG. 12 the equalizer 5 is provided between the multiplication part 2 and the equalizer 3, the same effect can be displayed even if it is provided between the initial phase correction part 1 and the multiplication part 2. The arrangement in this case is shown in FIG. 21. FIG. 21 is a block diagram showing another example of the arrangement of the carrier offset compensating circuit section of the digital radio receiver according to the third embodiment of the present invention.

Since the operation of each of the initial phase correction part 1, the multiplication part 2, and the equalizer 3 is the same as that of the first carrier offset compensating circuit, the description of those parts will be omitted.

The equalizer 5 is provided for the purposes of compensating for signal deterioration in the propagation path, compensating a filter in the transmitter or the receiver for its deterioration of frequency characteristics, and removing an interference component of a signal for compensation of the signal for its symbol timing.

The number of taps for the equalizer 5 is ten. For the initial value of the tap coefficient, (1+j0) is set at the center of the taps, and 0 is set at the other taps, without being reset on a frame basis.

The equalizer 5 uses a unique word (UW) as a known signal in a frame to update the tap coefficient from an error with the UW signal in the same manner as the equalizer 3 using the least means square (LMS) algorithm, thus performing waveform equalization.

Figure 13:
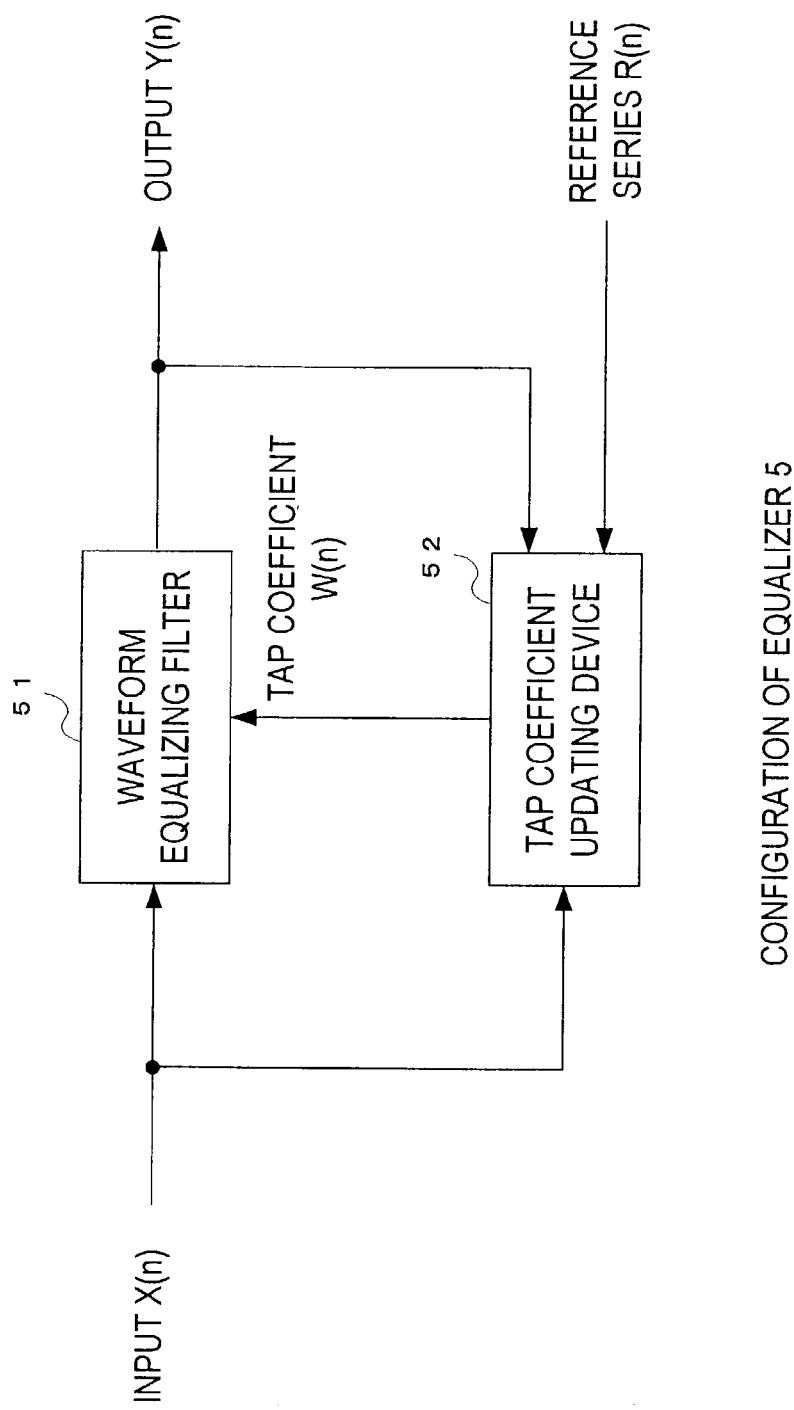
FIG. 13 is a block diagram showing a configuration of a 10-tap equalizer 5 in a third carrier offset compensating circuit according to the present invention.

Referring next to FIG. 13, an example of a configuration of the equalizer 5 will be described. FIG. 13 is a block diagram showing an example of a configuration of the 10-tap equalizer 5 in the third carrier offset compensating circuit according to the present invention.

The 10-tap equalizer 5 in the third carrier offset compensating circuit according to the present invention is constituted of a waveform equalizing filter 51 and a tap coefficient updating device 52.

The tap coefficient updating device 52 determines an error between an input signal after the waveform has been equalized and a reference series of unique words (UWs) as a known signal to determine and output a tap coefficient that minimizes the error.

The equalizer 5 uses, as its tap updating algorithm, the least means square (LMS) algorithm that minimizes the root means square error based on the steepest descent method, and the number of taps is ten.

The waveform equalizing filter 51 performs an addition by multiplying the input signal by the tap coefficient outputted from the tap coefficient updating device 52 to perform waveform equalization so as to obtain an output signal.

If the filter coefficient vector (input signal) before adapted is X(n), the filter coefficient vector (output signal) after adapted is Y(n), the step-size parameter is $\mu$, the error signal at the time of the n-th repetition is e(n), the tap input vector (tap coefficient) at the time of the n-th repetition is W(n), and the desired response (reference series) is R(n), the following equations are obtained:

$$Y(n)=X(n)+\mu W^*(n)e(n), \text{ and}$$

$$e(n)=R(n)-W^T(n)X(n).$$

Figure 14:
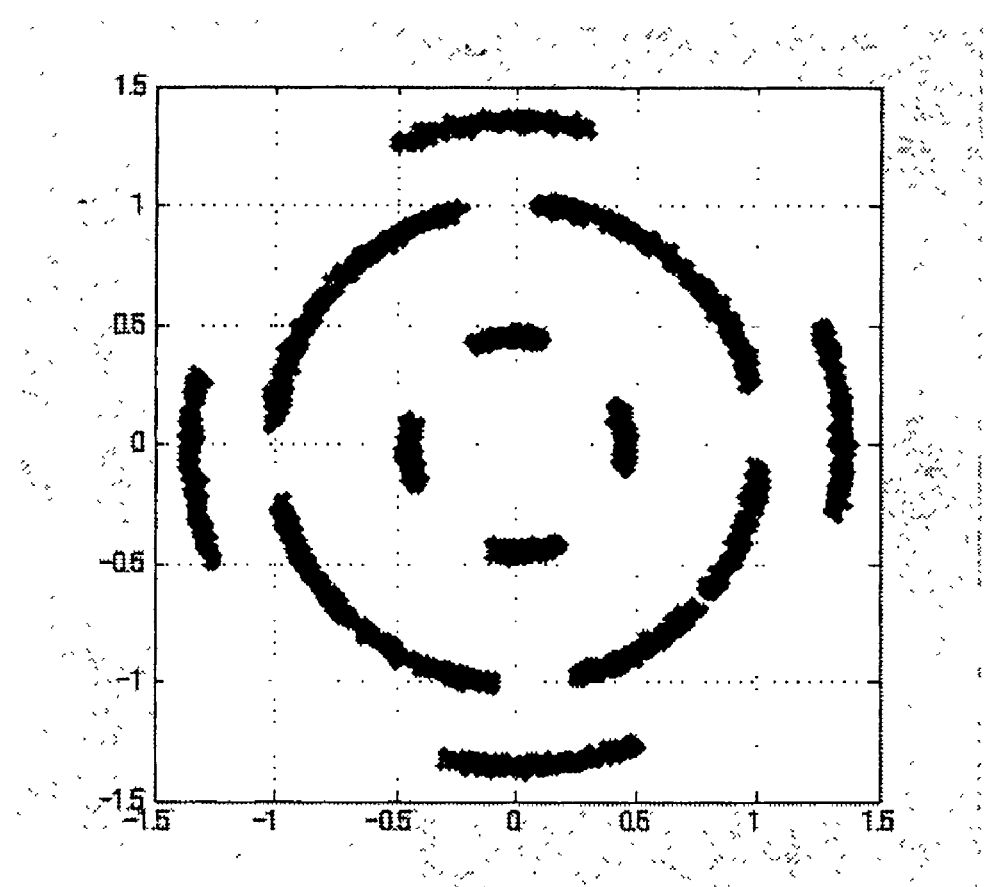
FIG. 14 is an illustration showing an example of a received signal in the third carrier offset compensating circuit according to the present invention.
Figure 15:
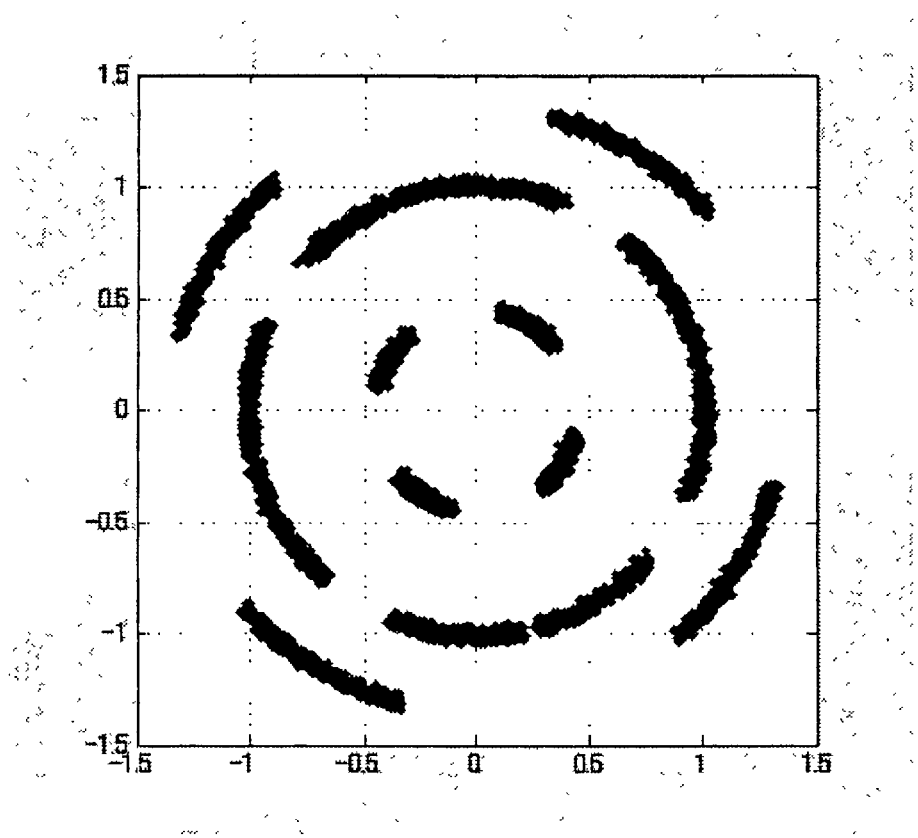
FIG. 15 is an illustration showing an example of an output signal from an initial phase correction part of the third carrier offset compensating circuit according to the present invention.
Figure 16:
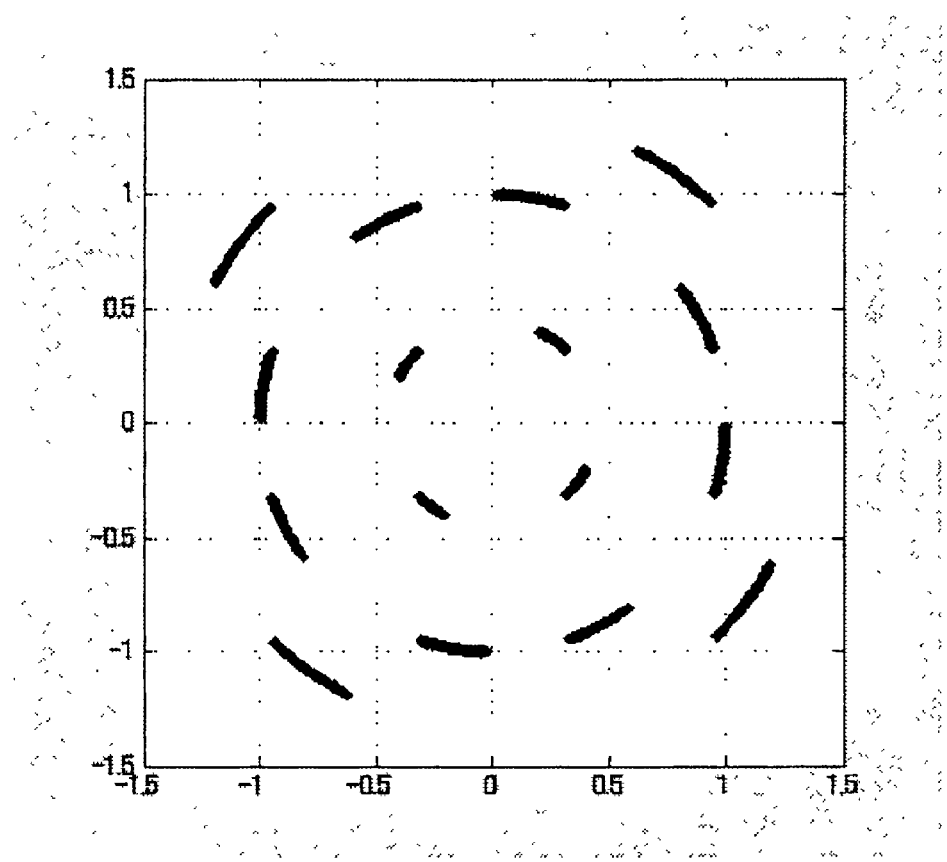
FIG. 16 is an illustration showing an example of an output signal from an equalizer 5 of the third carrier offset compensating circuit according to the present invention.
Figure 17:
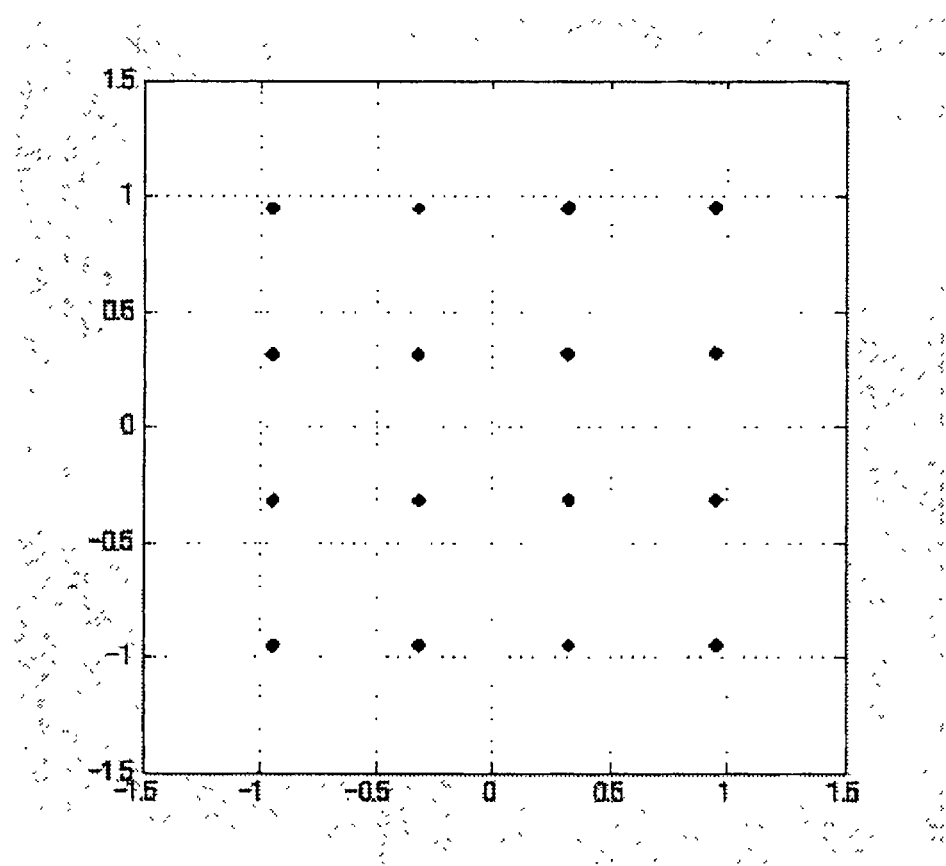
FIG. 17 is an illustration showing an example of an output signal from an equalizer 3 of the third carrier offset compensating circuit according to the present invention.

Using specific examples of FIGS. 14 to 17, description will be made next about the operation of the third carrier offset compensating circuit shown in FIG. 12. FIG. 14 is an illustration showing an example of a received signal in the third carrier offset compensating circuit. FIG. 15 is an illustration showing an example of an output signal from the initial phase correction part 1 of the third carrier offset compensating circuit. FIG. 16 is an illustration showing an example of an output signal from the equalizer 5 of the third carrier offset compensating circuit. FIG. 17 is an illustration showing an example of an output signal from the equalizer 3 of the third carrier offset compensating circuit.

As shown in FIG. 14, it is assumed that the received signal inputted into the initial phase correction part 1 has a waveform containing some deterioration caused in the propagation path or the like.

First, the initial phase correction part 1 detects a phase difference at the head of the frame from UW data inserted in the received frame, and outputs a signal with the phase difference corrected (FIG. 15). The signal is inputted into the multiplication part 2 in which the signal is multiplied by a tap coefficient of the immediately preceding symbol outputted from the equalizer 3, and inputted into the equalizer 5 in which the waveform of the signal is equalized. As a result, a signal waveform as shown in FIG. 16 is outputted. The signal waveform is such that variations in the phase and amplitude due to the deterioration of the propagation path shown in FIG. 14 is compensated for (from among variations in the phase and amplitude due to the rotation in the fixed direction caused by the carrier offset and the deterioration of the propagation path) with keeping only the rotation in the fixed direction caused by the carrier offset.

It should be noted that the amount of phase rotation is reduced by about half because the multiplication part 2 multiplies the signal by the tap coefficient of the immediately preceding symbol.

Next, the signal is inputted into the equalizer 3 in which the carrier offset is compensated for. As a result, the phase rotation in the fixed direction becomes extinct, and the signal is corrected to settle down at positions substantially near stationary points on the orthogonal coordinates as shown in FIG. 17. It can be found from FIG. 17 that the signal is compensated for its carrier offset.

Like in the configuration of FIG. 1, in the configuration shown in FIG. 12 or 21, the frequency characteristic to the error rate (BER) as a result of the simulation becomes a bowl-shaped characteristic as shown in FIG. 7. To extend the range of frequencies within which carrier offset compensation is further controllable, and hence level the characteristic, the third carrier offset compensating circuit can be combined with the second carrier offset compensating circuit by adding the equalizer 4 behind the equalizer 3. This configuration makes it possible to compensate the output of the equalizer 3 with higher accuracy, and hence obtain a demodulated signal with a lower error rate.

Figure 22:
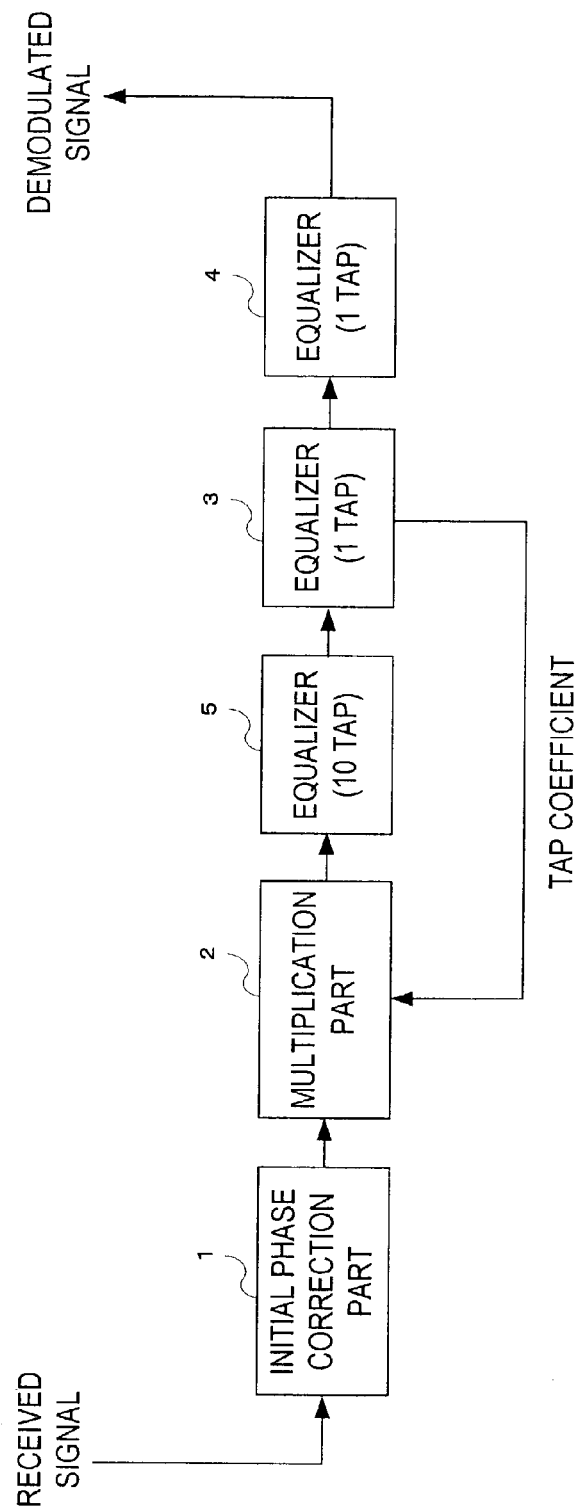
FIG. 22 is a block diagram showing the arrangement of a carrier offset compensating circuit section of a digital radio receiver as practiced in a combination of the second and third embodiments of the present invention.
Figure 23:
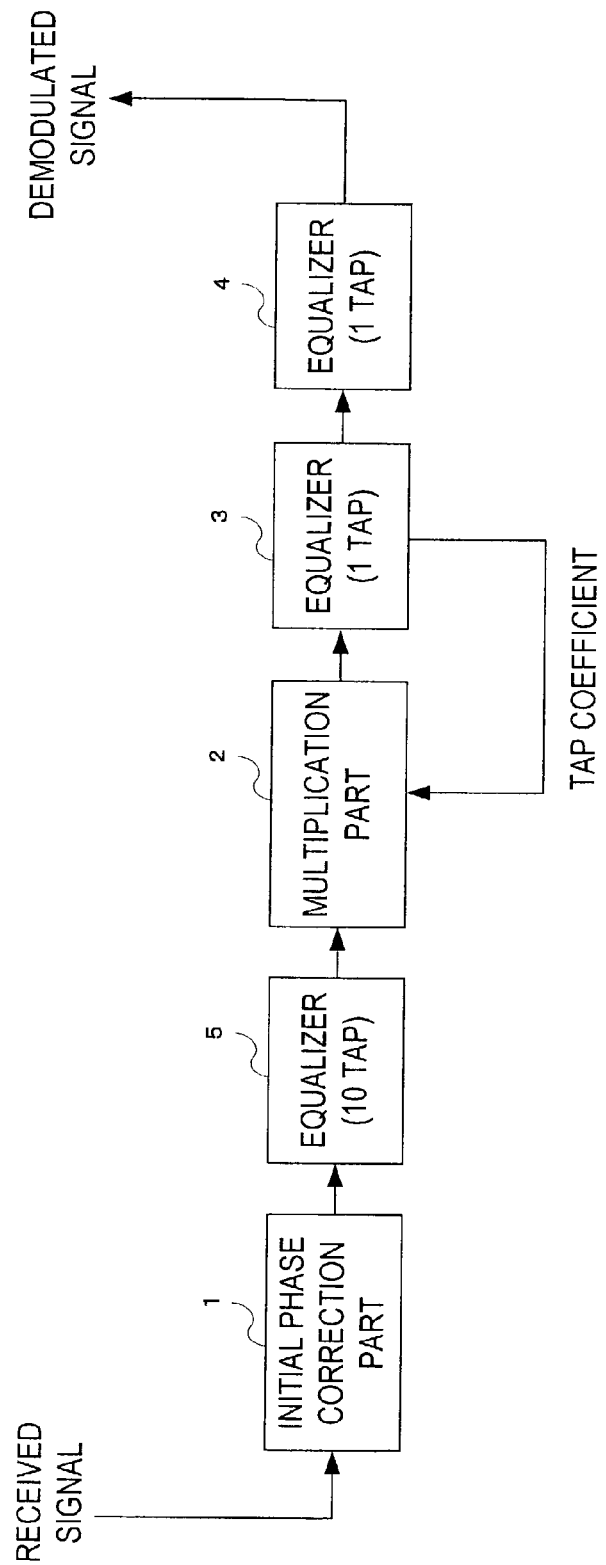
FIG. 23 is a block diagram showing the arrangement of a carrier offset compensating circuit section of a digital radio receiver as practiced in another combination of the second and third embodiments of the present invention.

FIGS. 22 and 23 show examples of the configuration in which the equalizer 4 is added. FIGS. 22 and 23 are block diagrams showing examples of the configuration of the carrier offset compensating circuit section of the digital radio receiver as practiced in a combination of the third embodiment with the second embodiment.

Figure 18:
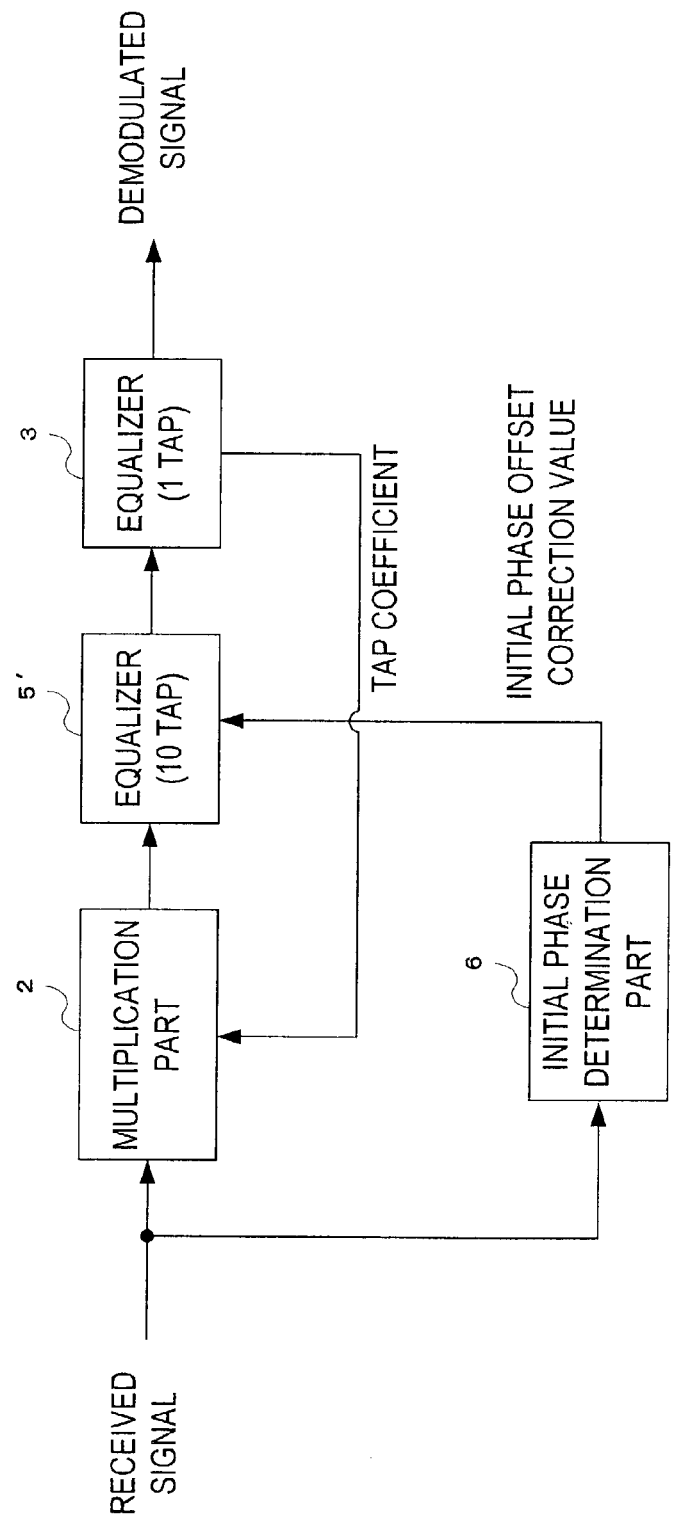
FIG. 18 is a block diagram showing an example of the arrangement of a carrier offset compensating circuit section of a digital radio receiver according to a fourth embodiment of the present invention.

Referring next to FIG. 18, description will be made about a digital radio receiver according to the fourth embodiment of the present invention. In the fourth embodiment, the size of the third carrier offset compensating circuit is reduced. FIG. 18 is a block diagram of the arrangement of a carrier offset compensating circuit section of the digital radio receiver according to the fourth embodiment of the present invention. In FIG. 18, the same portions as those in FIG. 12 are given the same reference numerals.

As shown in FIG. 18, the carrier offset compensating circuit section (fourth carrier offset compensating circuit) of the digital radio receiver according to the fourth embodiment of the present invention is provided with, as feature parts of the fourth carrier offset compensating circuit, an initial phase determination part 6 instead of the initial phase correction part 1 and an equalizer 5' instead of the equalizer 5, in addition to the third carrier offset compensating circuit that is constituted of the multiplication part 2 and the equalizer 3.

Figure 24:
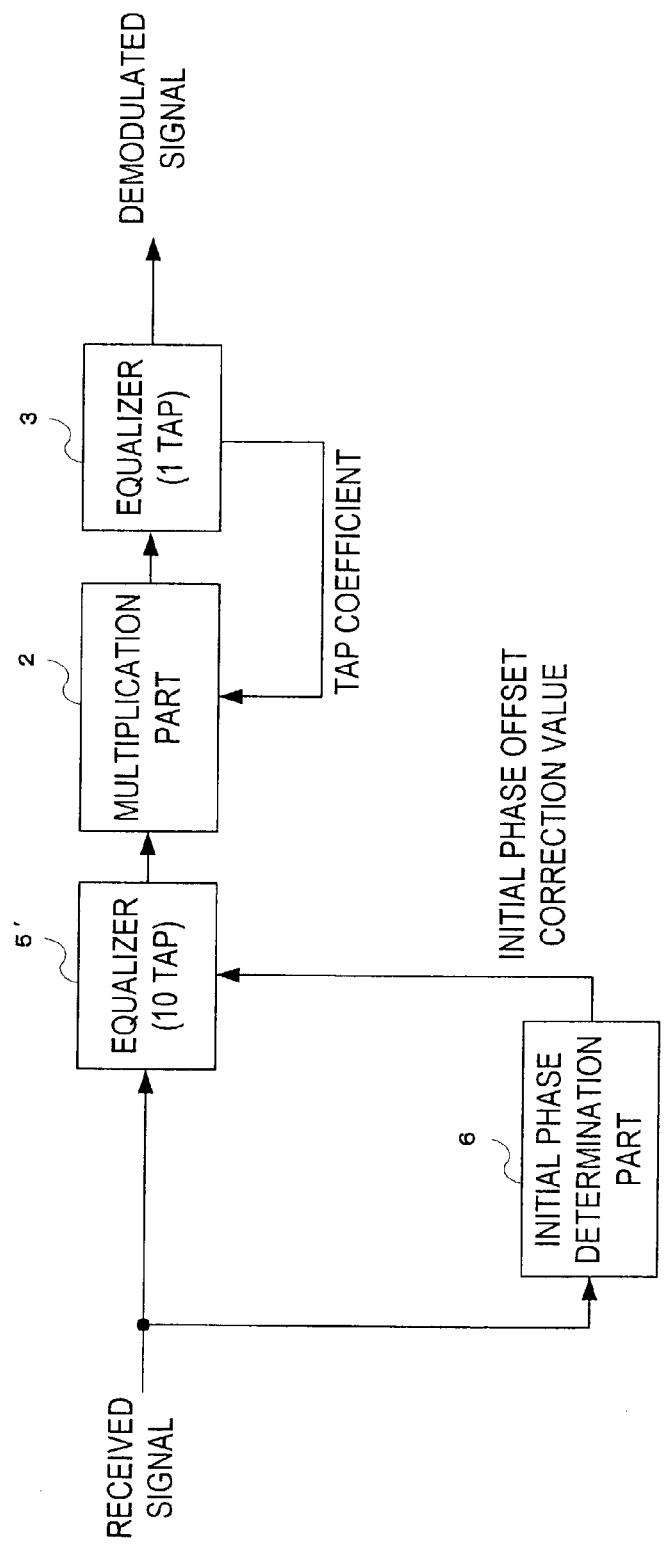
FIG. 24 is a block diagram showing another example of the arrangement of the carrier offset compensating circuit section of the digital radio receiver according to the fourth embodiment of the present invention.

Although in FIG. 18 the equalizer 5' is provided between the multiplication part 2 and the equalizer 3, the same effect can be displayed even if it is provided before the multiplication part 2. The arrangement in this case is shown in FIG. 24. FIG. 24 is a block diagram showing another example of the arrangement of the carrier offset compensating circuit section of the digital radio receiver according to the fourth embodiment of the present invention.

Since the operation of each of the multiplication part 2 and the equalizer 3 is the same as that of the third carrier offset compensating circuit, the description of those parts will be omitted.

The initial phase determination part 6 detects a phase difference at the head of the frame from the known unique word in the received signal, and outputs the phase difference as an initial phase offset estimated value.

Specifically, as shown in FIG. 20, a unique word (UW) (for example, 14 symbols) known to both the transmitter and receiver is incorporated in the head of each frame and transmitted on a frame basis. Therefore, the phase is determined on a symbol basis from the following equation:

$$\theta = \arctan(Qr/Ir).$$

Then the initial phase determination part 6 calculates a difference of the phase of each UW symbol from the original phase to obtain a mean value as a frame phase (initial phase) correction value.

It should be noted that the way of determining the phase of a symbol is not limited to a phase calculation of arcTan. When real-time processing is performed in an actual hardware environment, any other phase detection means conventionally known may be used.

Like the equalizer 5 in the third carrier offset compensating circuit, the equalizer 5' is provided for the purposes of compensating for signal deterioration in the propagation path, compensating a filter in the transmitter or the receiver for its deterioration of frequency characteristics, and compensating the signal for its symbol timing. A different point is the setting of the initial value of the tap coefficient.

In other words, though the number of taps for the equalizer 5' of the fourth carrier offset compensating circuit is ten, the initial phase offset estimated value inputted into the center of the taps from the initial phase determination part 6 is set for the initial value of the tap coefficient, and the others are set to 0, without being reset on a frame basis.

The equalizer 5 uses a unique word (UW) in a frame to update the tap coefficient from an error with the UW signal in the same manner as the equalizer 3 using the least means square (LMS) algorithm, thus performing waveform equalization.

Since the fourth embodiment features that the initial phase offset correction value is inserted into the center of the taps, the signal can be outputted to the equalizer 3 provided at the following stage while returning to the initial phase.

Next, the operation of the fourth carrier offset compensating circuit shown in FIG. 18 will be described.

In the fourth carrier offset compensating circuit of the present invention, the received signal is inputted into the initial phase determination part 6. The initial phase determination part 6 detects a phase difference at the head of the frame from the UW data inserted in the received frame, and outputs an initial phase offset correction value. Then, the equalizer 5' sets the initial phase offset correction value as the initial value of the tap coefficient.

The multiplication part 2 multiplies the received signal by a tap coefficient of the immediately preceding symbol from the equalizer 3, and inputs the same into the equalizer 5' in which the signal is equalized. This configuration makes them possible to correct the initial phase and compensate for variations in the phase and amplitude due to deterioration in the propagation path. As a result, a signal as shown in FIG. 16 is outputted.

After that, the fourth carrier offset compensating circuit operates in the same manner as the third carrier offset compensating circuit.

In the above-mentioned operation, although the initial phase determination part 6 detects any phase even if the signal phase at the head of the frame is received at a different position each time due to a carrier offset, the equalizer 5' can correct the initial phase instantaneously at an early stage according to the initial phase offset correction value without the provision of the initial phase correction part 1. Therefore, carrier offset compensation can be implemented with high accuracy with a pared-down carrier offset compensating circuit.

Like in the configuration of FIG. 1, in the configuration shown in FIG. 18 or 24, the frequency characteristic to the error rate (BER) as a result of the simulation becomes a bowl-shaped characteristic as shown in FIG. 7. To extend the range of frequencies within which carrier offset compensation is further controllable, and hence level the characteristic, the fourth carrier offset compensating circuit can be combined with the second carrier offset compensating circuit by adding the equalizer 4 behind the equalizer 3. This configuration makes it possible to compensate the output of the equalizer 3 with higher accuracy, and hence obtain a demodulated signal with a lower error rate.

Figure 25:
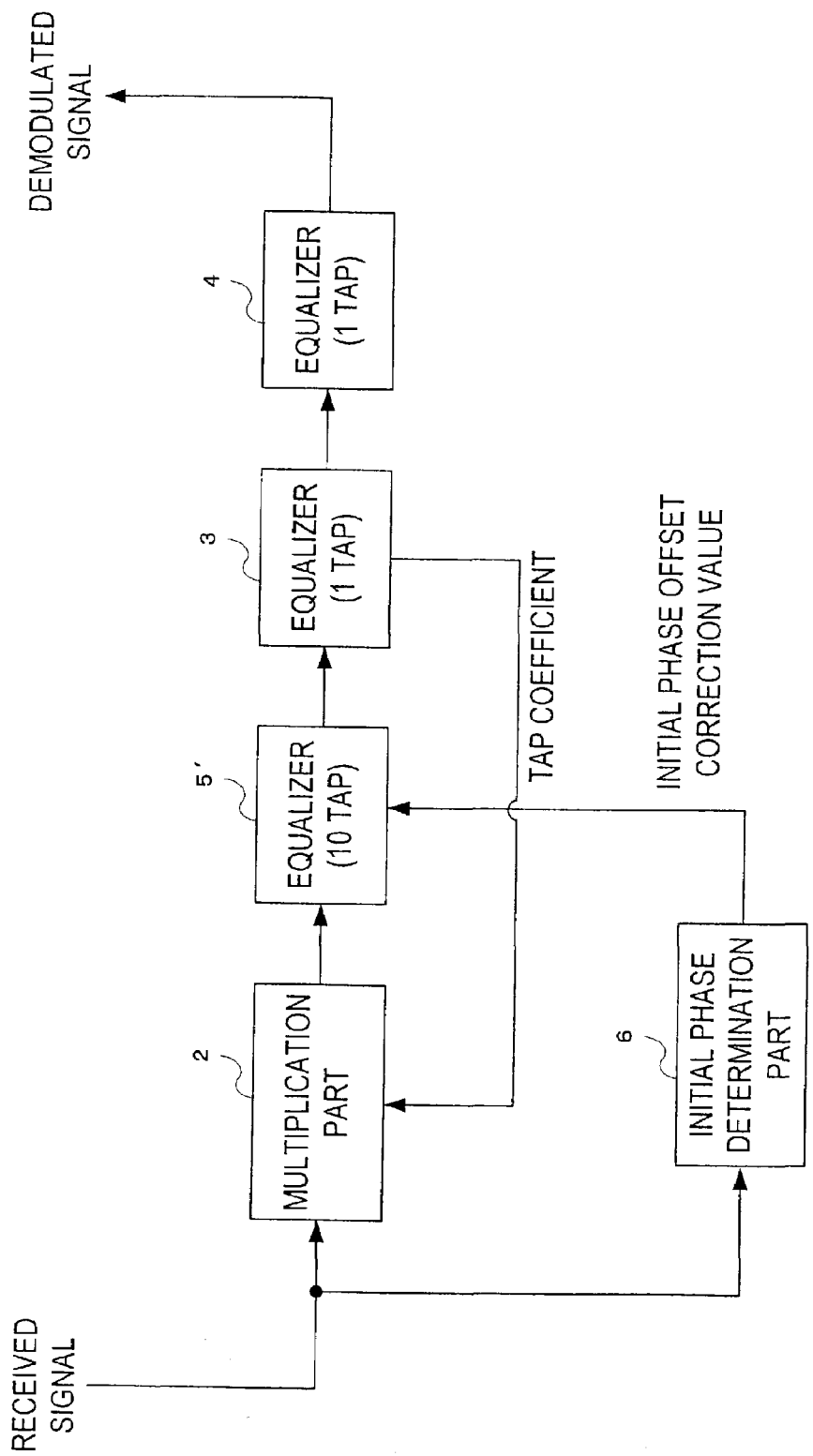
FIG. 25 is a block diagram showing the arrangement of a carrier offset compensating circuit section of a digital radio receiver as practiced in a combination of the second and fourth embodiments of the present invention.
Figure 26:
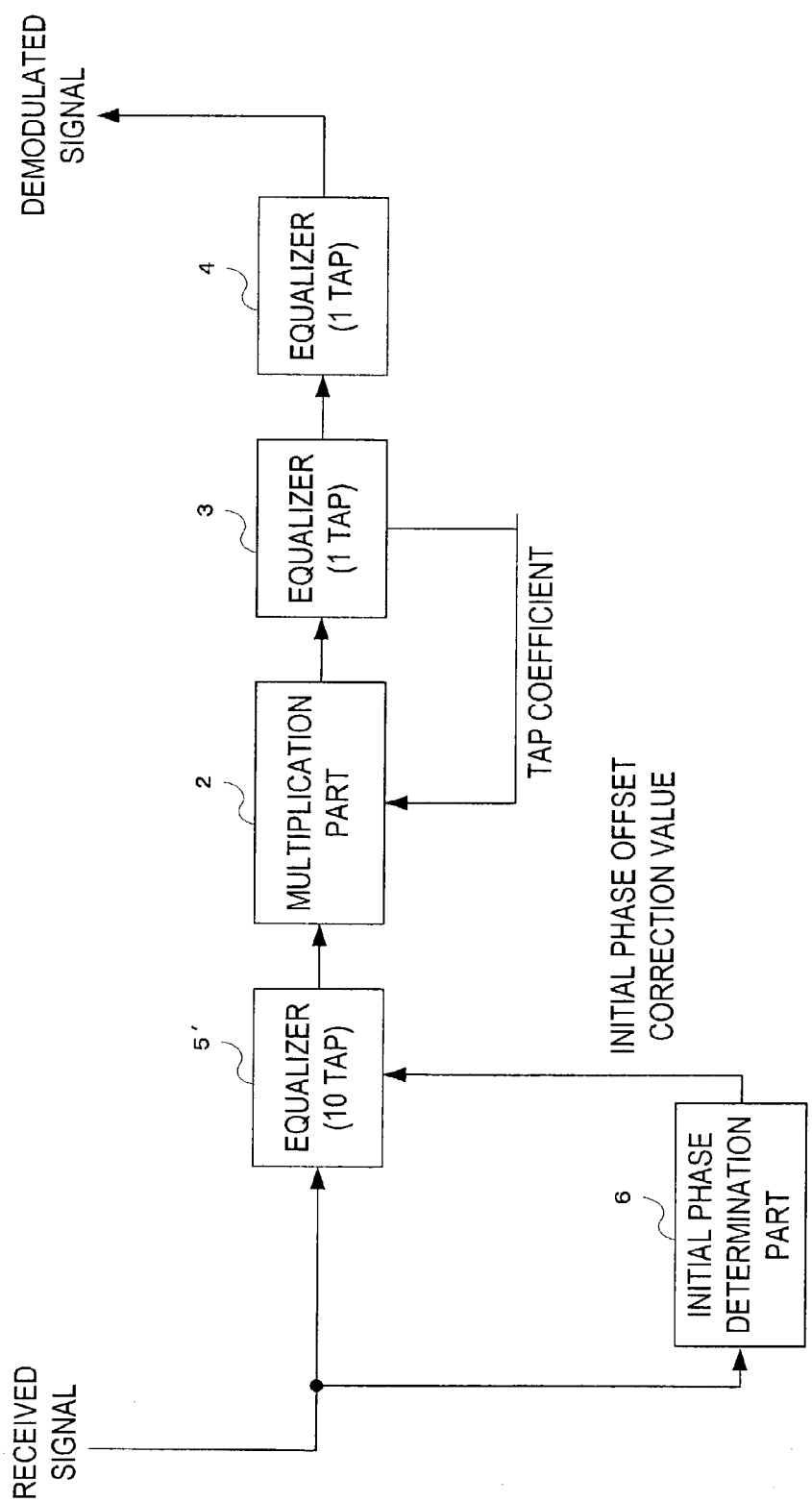
FIG. 26 is a block diagram showing the arrangement of a carrier offset compensating circuit section of a digital radio receiver as practiced in another combination of the second and fourth embodiments of the present invention.

FIGS. 25 and 26 show examples of the configuration in which the equalizer 4 is added. FIGS. 25 and 26 are block diagrams showing examples of the configuration of the carrier offset compensating circuit section of the digital radio receiver as practiced in a combination of the fourth embodiment with the second embodiment.

In the above-mentioned embodiments, a 16 QAM digital radio receiver was described as examples, but the technique according to the present invention is also applicable to any other phase modulation system (such as QPSK or 1024 QAM).

According to the embodiments of the present invention, the digital radio receiver is provided with the multiplication part 2 on the input side of the equalizer 3 (first equalizer) for carrier offset compensation, such that the received signal is multiplied by a tap coefficient of the immediately preceding symbol outputted from the equalizer 3. The multiplication part 2 performing multiplication of the current symbol by the tap coefficient of the immediately preceding symbol means implementing carrier offset compensation while predicting a frequency offset to be rotated in the fixed direction, so that the range that can cope with frequency offsets can be extended, thereby securing stable operation.

Further, according to the embodiments of the present invention, the digital radio receiver is such that the initial phase correction part 1 detects a phase difference at the head of the frame from the unique word of the received signal, and corrects the phase difference to avoid the mistake of determining of an area of a first signal. This configuration makes it possible to speed up a convergence of equalization errors, and hence secure stable operation soon after the initiation of communication.

According to the second embodiment of the present invention, the digital radio receiver is provided with the equalizer 4 as the second equalizer downstream of the equalizer 3 (first equalizer) for carrier offset compensation, such that the equalizer 4 compensates for carrier offsets that have not been adapted by the equalizer 3 alone. This configuration makes them possible to extend the range of frequencies within which carrier offset compensation is controllable, and level the frequency-to-BER characteristic over a wide range of frequencies. Thus the compensation accuracy can be improved to secure stable operation.

According to the third embodiment of the present invention, the digital radio receiver is provided with the 10-tap equalizer 5 as the third equalizer that performs waveform equalization while updating a tap coefficient using the UW. This configuration makes possible, in addition to carrier offset compensation, removal of an interference component of a signal to compensate the propagation path or the like for its deterioration so as to secure stable operation.

According to the fourth embodiment of the present invention, the digital radio receiver is such that the initial phase determination part 6 detects a phase difference at the head of the frame to determine an initial phase offset correction value to be set as the initial value of the tap coefficient for the equalizer 5' as the third equalizer that performs waveform equalization, so that the equalizer 5' can not only compensate the propagation path for its deterioration, but also correct the initial phase without the provision of the initial phase correction part 1. In this configuration, the mistake of determining the area of the first signal can be avoided with a pared-down carrier offset compensating circuit to speed up a convergence of equalization errors, thereby realizing stable operation soon after the initiation of communication.

As described above and according to the present invention, the digital radio receiver is such that the multiplier multiplies the received signal by a tap coefficient of the immediately preceding symbol updated by and outputted from the first equalizer to obtain an input signal of the first equalizer, and the first equalizer performs waveform equalization while updating the tap coefficient based on the input signal and its area-determination result. This operation corresponds to carrier offset compensation while predicting a frequency offset to be rotated in the fixed direction, so that the range that can cope with offset frequencies can be extended, thereby securing stable operation.

The digital radio receiver according to the present invention is also provided with the second equalizer on the output side of the firs equalizer, in which the second equalizer performs waveform equalization while updating the tap coefficient based on the output signal of the first equalizer and its area-determination result to output a decoded signal, whereby the second equalizer compensates for any carrier offset that has not been adapted by the first equalizer alone. This configuration makes them possible to extend the range of frequencies within which offset compensation is controllable, and level a frequency-to-BER characteristic over a wide range of frequencies. Thus the compensation accuracy can be improved to secure stable operation.

Further, the digital radio receiver according to the present invention is provided with the third equalizer either on the input side of the multiplication part or between the multiplication part and the first equalizer, in which the third equalizer performs waveform equalization while updating the tap coefficient based on a known signal inserted in the received signal. This configuration makes possible, in addition to carrier offset compensation, removal of an interference component of a signal to compensate a propagation path or the like for its deterioration so as to secure stable operation.

Furthermore, the digital radio receiver is such that the initial phase correction part determines a phase shift from the known signal inserted in the received signal and corrects the initial phase so that the received signal with the corrected initial phase will be an input to the multiplication part or the third equalizer. This configuration makes it possible to avoid the mistake of determining the area of the first signal, and hence speed up a convergence of equalization errors. Consequently, stable operation can be realized soon after the initiation of communication.

Furthermore, the digital radio receiver according to the present invention is such that the initial phase determination part determines a phase shift from the known signal inserted in the received signal and outputs an initial phase offset value so that the third equalizer will set the initial phase offset value as the initial value of the tap coefficient. In this configuration, the initial phase is corrected without the provision of the initial phase correction part, so that the mistake of determining the area of the first signal can be avoided with a pared-down carrier offset compensating circuit, thereby speeding up a convergence of equalization errors. Consequently, stable operation can be realized soon after the initiation of communication.

What is claimed is:

1. A digital radio receiver comprising:
   a first equalizer with one tap, which performs waveform equalization and updates a tap coefficient based on a received signal and a result of determination of an area of the output signal of the first equalizer;
   a multiplication part provided on the input side of said first equalizer to multiply the received signal by the tap coefficient undated by and outputted from said first equalizer so as to generate an input signal of said first equalizer; and
   a second equalizer provided on the output side of said first equalizer, which performs waveform equalization and updates the tap coefficient based on an output signal from the first equalizer and a result of determination of an area of the output signal to output a decoded signal inside.

2. A digital radio receiver to output a decoded signal comprising:
   a first equalizer which performs waveform equalization while updating a tap coefficient based on a received signal and a result of determination of an area of the received signal;
   a multiplication part provided on the input side of said first equalizer to multiply the received signal by the tap coefficient updated by and outputted from said first equalizer so as to generate an input signal of said first equalizer; and
   a second equalizer provided between said multiplication part and said first equalizer or on the input side of said multiplication part, which is comprised of a plural of taps and performs waveform equalization while updating the tap coefficient based on a known signal inserted in the received signal.

3. The digital radio receiver according to claim 1, wherein a third equalizer is provided between said multiplication part and said first equalizer, said third equalizer performing waveform equalization while updating the tap coefficient based on a known signal inserted in the received signal.

4. The digital radio receiver according to claim 1, further comprising:
   an initial phase correction part which calculates a mean value of differences of the phase of each unique word symbols inserted in the received signal from the original phase, and corrects the initial phase so that the received signal with the corrected initial phase will be an input to said multiplication part.

5. The digital radio receiver according to claim 2, wherein an initial phase correction part is provided for determining a phase shift from the known signal inserted in the received signal and correcting the initial phase so that the received signal with the corrected initial phase will be an input to said multiplication part.

6. The digital radio receiver according to claim 2, wherein an initial phase determination part is provided for determining a phase shift from the known signal inserted in the received signal and outputting an initial phase offset value so that said second equalizer will set the initial phase offset value as the initial value of the tap coefficient.

7. A digital radio receiver to output a decoded signal comprising:
   a first equalizer with one tap, which performs waveform equalization while updating a tap coefficient based on a received signal and a result of determination of an area of the output signal of the first equalizer;
   a second equalizer with one tap, which is provided on the output side of the first equalizer, and performs waveform equalization while updating the tap coefficient based on an output signal from the first equalizer and a result of determination of an area of the output signal of the second equalizer; and
   a third equalizer with a plurality of taps, which is provided before the first equalizer, and performs waveform equalization while updating the tap coefficient based on a known signal inserted in the received signal.

* * * * *